US006403725B1

(12) United States Patent
Huang et al.

(10) Patent No.: US 6,403,725 B1
(45) Date of Patent: Jun. 11, 2002

(54) METAL CONTAINING DISPERSANT POLYMERS FROM CONDENSATION OF POLYMERS CONTAINING ACIDIC GROUP WITH OVERBASED COMPOSITIONS CONTAINING REACTIVE NUCLEOPHILIC GROUP

(75) Inventors: Nai Z. Huang, Highland Hts.; Richard M. Lange, Euclid, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/378,587

(22) Filed: Aug. 20, 1999

(51) Int. Cl.[7] ................................................ C08F 8/42
(52) U.S. Cl. ................. 525/326.9; 525/327.6; 525/327.7; 525/328.8; 525/329.9; 525/330.1; 525/330.5; 525/330.6; 525/366; 525/370; 525/398; 525/400; 525/411; 525/415
(58) Field of Search ............ 525/326.9, 327.6, 525/327.7, 328.8, 329.9, 330.1, 330.5, 330.6, 366, 320, 398, 400, 411, 415

(56) References Cited

U.S. PATENT DOCUMENTS

| 3,189,543 A | 6/1965 | Criddle ........................ 252/18 |
| 3,271,310 A | 9/1966 | Le Suer ....................... 252/35 |
| RE26,433 E | 8/1968 | Le Sur ........................ 252/33.6 |
| 3,496,105 A | 2/1970 | Le Suer ....................... 252/33.6 |
| 3,714,042 A | 1/1973 | Greenough ................ 252/33.2 |
| RE27,582 E | 2/1973 | Kahn et al. ................ 252/32.7 |
| 3,730,895 A | 5/1973 | Kjonaas ....................... 252/18 |
| 4,171,273 A | 10/1979 | Waldbillig et al. ...... 252/51.5 A |
| 4,248,718 A | 2/1981 | Vaughan ..................... 252/33 |
| 4,489,194 A | 12/1984 | Hayashi ..................... 525/193 |
| 5,262,075 A | 11/1993 | Chung et al. ............. 252/51.5 |
| 5,534,169 A | 7/1996 | Vinci ......................... 508/460 |
| 5,556,569 A | 9/1996 | Huang ........................ 508/545 |
| 5,562,864 A | 10/1996 | Salomon et al. ............ 508/232 |
| 5,681,799 A | 10/1997 | Song et al. ................. 508/454 |

FOREIGN PATENT DOCUMENTS

| DE | 2014880 | 10/1970 |
| DE | 19540090 | 4/1997 |
| EP | 0275658 | 7/1988 |
| GB | 2054607 | 2/1981 |
| GB | 2211849 | 7/1989 |
| WO | WO 88/03551 | 5/1988 |

*Primary Examiner*—Bernard Lipman
(74) *Attorney, Agent, or Firm*—Joseph P. Fischer; David M. Shold; Michael F. Esposito

(57) ABSTRACT

Disclosed is a metal containing polymer composition comprising;
  a metal overbased imide or ester functionalized polymer prepared by reacting
    (A) a polymer comprising
      (A1) an acidic functionalized polymer or ester functionalized polymer;
      (A2) an acidic mixed ester-acid of a carboxy containing interpolymer; or
      (A3) an ester functionalized polymer comprising a lactone and
    (B) a metal overbased composition that contains a reactive basic functionality comprising
      (B1) a metal overbased amine wherein the reactive basic functionality is a primary or secondary amino group;
      (B2) a metal overbased hydroxy substituted carboxylic acid wherein the reactive basic functionality is a hydroxy group; or
      (B3) a metal overbased dispersant wherein the reactive basic functionality is a primary or secondary amino group.

34 Claims, No Drawings

METAL CONTAINING DISPERSANT POLYMERS FROM CONDENSATION OF POLYMERS CONTAINING ACIDIC GROUP WITH OVERBASED COMPOSITIONS CONTAINING REACTIVE NUCLEOPHILIC GROUP

FIELD OF THE INVENTION

This invention relates to the development of novel polymeric compositions that have utility as new generation dispersant-viscosity modifiers. Overbased compositions have an excess of metal carbonate and, for that reason, are considered basic compositions. Because overbased compositions have this excess basicity, be they overbased amines, overbased acids or overbased dispersants, they can be reacted with compositions possessing acidic functionality.

BACKGROUND OF THE INVENTION

U.S. Reissue 26,433 (LeSuer, Aug. 6, 1968) relates to oil soluble metal salts of substituted succinic acid acylated aliphatic polyamines and processes for their preparation. These salts are prepared by a process which comprises reacting, at a temperature within the range of from about 20° C. to about 250° C., (A) about two equivalents of a succinic compound selected from the class consisting of hydrocarbon-substituted succinic acids and hydrocarbon-substituted succinic anhydrides wherein the hydrocarbon substituent has at least about 50 aliphatic carbon atoms, (B) about one equivalent of a basic metal reactant selected from the class consisting of alkali metal, alkaline earth metal, lead, cadmium and zinc oxides, hydroxides, carbonates and lower alcoholates and the combination of an alkali metal hydroxide and inorganic metal salt selected from the class consisting of alkaline earth metal, lead, cadmium, zinc, nickel, and cobalt halides and nitrates, and (C) from one to about five equivalents of an amine selected from the class consisting of alkylene polyamines and hydroxy alkyl-substituted alkylene polyamines. In the usual case from about one to about two equivalents of amine is used.

U.S. Reissue 27,582 (Kahn et al., Feb. 6, 1973) relates to an overbased detergent-dispersant for an oil composition prepared by reacting a metal base, such as barium hydroxide or calcium hydroxide, with an acidic gas such as $CO_2$, $H_2S$, or $SO_2$ in the presence of an amide, imide or ester derived from a high-molecular weight monocarboxylic or polycarboxylic acid of from 40 to 250 carbon atoms and from an organic nitrogen-containing compound having at least one amino group or hydroxy group, including alkylene polyamines, hydroxyalkyl amines and N-hydroxy alkyl morpholinones. Useful compositions are prepared by blending these reactions products into fuels and lubricants.

U.S. Pat. No. 3,189,543 (Criddle, Jun. 15, 1965) is directed to lubricating grease compositions, more particularly to the use of certain agents to improve the yield of calcium base greases whereby the yields of grease compositions are increased by incorporating therein an oil-soluble polyglycol polymer, which grease composition contains a calcium soap of 12-hydroxy stearic acid (or its equivalent), calcium acetate in amount of from 2 mols to 5 mols for each mol of said calcium soap of 12-hydroxy stearic acid, excess base expressed as calcium hydroxide, and calcium carbonate in amounts sufficient to impart improved consistency to said grease composition, which calcium carbonate is obtained by reacting urea with calcium hydroxide.

U.S. Pat. No. 3,271,310 LeSuer, Sep. 6, 1966) relates to new chemical compositions and to hydrocarbon compositions containing the same. More particularly, the reference relates to a novel class of chemical compositions useful as detergents and rust inhibitors. Still, more particularly, this reference relates to metal salts of hydrocarbon-substituted succinic acids. The hydrocarbon-substituted succinic compounds of the metal salt compositions are readily obtainable from the reaction of maleic anhydride or maleic acid and a high molecular weight olefin or a chlorinated hydrocarbon or other high molecular weight hydrocarbon containing an activating polar substituent, i.e., a substituent which is capable of activating the hydrocarbon molecule with respect to the reaction with maleic anhydride or the acid thereof. Said reaction involves heating equivalent portions of the maleic anhydride and hydrocarbon, for example, at a temperature within the range of from about 100° C. to about 200° C. The resulting product is a hydrocarbon-substituted succinic anhydride. The succinic anhydride may be hydrolyzed to the corresponding acid by treatment with water or steam. The hydrocarbon-substituted succinic acid is preferred for the purposes of this invention.

U.S. Pat. No. 3,496,105 (LeSuer, Feb. 17, 1970) relates to a process for reacting anions of acidic materials with basic metal-containing organic complexes whereby the anions are incorporated into the metal-containing complex. The anions of an inorganic acid can be reacted with a basic, carbonated Group II metal-containing complex to incorporate the anions into the reaction product. The products are useful as additives for lubricating oils and liquid hydrocarbon fuels as well as being intermediates for subsequent chemical reactions.

U.S. Pat. No. 3,714,042 (Greenough, Jan. 30, 1973) relates to the treatment of basic metal sulfonate complexes, sulfonate-carboxylate complexes and carboxylate complexes with high molecular weight carboxylic acids or derivatives thereof and the products resulting from said treatment. It relates also to the reduction of the foaming tendency of lubricating compositions containing these basic metal complexes.

U.S. Pat. No. 4,171,273 (Waldbillig et al., Oct. 16, 1979) is directed to succinate and succinimide derivatives of copolymers of ethylene and an alpha-olefin that are effective as polyfunctional additives exhibiting shear stable VI improvement, pour depressancy and dispersency when minor amounts thereof are added to lubricating oils, particularly petroleum based automotive lubricating oils. An additive concentrate, containing about 5 to 30 weight percent of these copolymer derivatives in a solvent, facilitates the introduction of the additive into a final lubricating oil blend. These polyfunctional additives may be prepared by reacting an ethylene-alphaolefin copolymer, such as ethylene-propylene copolymer with maleic anhydride in the presence of a free radical initiator. This anhydride is then reacted with a fatty alcohol to prepare the succinate ester. Any unesterified carboxylic acid or anhydride groups are then converted to the succinimide by reaction with a polyamine.

U.S. Pat. No. 4,248,718 (Vaughan, Feb. 3, 1981) relates to an overbased dispersant for lubricating oil compositions having a very low ash content as compared to conventional overbased additives, the overbased dispersant can be prepared by combining in a solvent at a temperature suitable for reaction to occur the components (a) at least one ashless nitrogen-containing compound selected from ammonia, ammonium salts, and organic compounds containing only carbon, hydrogen, and nitrogen and having at least one —NH— group, (b) a basically reacting metallic compound, (c) at least one suspending agent for component (b), and (d) a chalcogen compound selected from carbon dioxide, carbon disulfide, carbon oxysulfide, or sulfur dioxide and mixtures thereof. To insure that the composition prepared by this reaction has a relatively low ash content, the ratio of the reactants (a), (b), (c), and (d) must be such that from about ⅓ to about ¾ of the alkalinity value of the final product is derived from the ashless portion of these reactants.

U.S. Pat. No. 4,489,194 (Hayashi, Dec. 18, 1984) is directed to hydrocarbyl substituted carboxylic acylating agents made by reacting, optionally in the presence of chlorine or bromine, (A) one or more alpha-beta olefinically unsaturated carboxylic acid reagents containing 2 to about 20 carbon atoms, exclusive of the carboxyl-based groups with (B) one or more high molecular weight olefin polymers of more than 30 carbon atoms selected from the group consisting of (i) interpolymers of $C_{2-8}$ mono-1-olefins with $C_{12}$–$C_{30}$ mono-olefins, (ii) mixtures of (a) homopolymers and/or interpolymers of $C_{2-8}$ mono-1-olefins with (b) homopolymers and/or interpolymers of $C_{12}$–$C_{30}$ mono-olefins, and (iii) chlorinated or brominated analogs of (i) or (ii).

U.S. Pat. No. 5,262,075 (Chung et al., Nov. 16, 1993) is directed to multifunctional viscosity index improver additives for oleaginous composition comprising reaction products of (i)(a) ethylene-alpha-olefin copolymers grafted with (i)(b) carboxylic acid material, further reacted with (ii) at least one of polyamine, polyol, about $C_{30}$–$C_{400}$ hydrocarbyl substituted carboxylic acid component together with polyol, or said carboxylic acid component together with polyamine, wherein the copolymer (i)(a) comprises intramolecularly heterogeneous copolymer chains containing at least one crystallizable segment of methylene units and at leant one low crystallinity ethylene-alpha-olefin copolymer segment, and wherein said copolymer has a molecular weight distribution characterized by at least one of a ratio of $\overline{M}_w/\overline{M}_n$ of less than 2 and a ratio of $\overline{M}_n/\overline{M}_w$ of less than 1.8.

U.S. Pat. No. 5,534,169 (Vinci, Jul. 9, 1996) comprises a method for reducing friction between relatively slideable components comprising applying to a slideably engaging surface of the slideable components a lubricating amount of at least one Newtonian, or non-Newtonian, metal overbased salt of a carboxylic acid wherein the metal is selected from the group consisting of lithium, calcium, sodium, barium, magnesium, and mixtures thereof, and the carboxylic acid comprises at least one linear unsaturated hydrocarbon group containing from about 8 to about 50 carbon atoms. The types of slideable components contemplated include flat-bearings, rotating bearings, lead screws and nuts, gears, hydraulic systems, and pneumatic devices.

U.S. Pat. No. 5,556,569 (Huang, Sep. 17, 1996) is directed to organic compounds having at least one hydrocarbyl group and a polar group containing at least one nitrogen, oxygen, or sulfur atom, being free from acidic hydrogen atoms and from functional groups which provide such organic compounds with acidic hydrogen atoms upon hydrolysis, can be overbased by treatment with a metallic base and a low molecular weight acid, to provide useful lubricant additives.

U.S. Pat. No. 5,562,864 (Salomon et al., Oct. 8, 1996) discloses a lubricating oil composition which comprises a major amount of an oil of lubricating viscosity and (A) at least about 1% by weight of at least one carboxylic derivative composition produced by reacting (A-1) at least one substituted succinic acylating agent containing at least about 50 carbon atoms in the substituent with (A-2) from about 0.5 equivalent up to about 2 moles, per equivalent of acylating agent (A-1), of at least one amine compound characterized by the presence within its structure of at least one HN<group; and (B) an amount of at least one alkali metal overbased salt of a carboxylic acid or a mixture of a carboxylic acid and an organic sulfonic acid sufficient to provide at least about 0.002 equivalent of alkali metal per 100 grams of the lubricating oil composition provided that when the alkali metal salt comprises a mixture of overbased alkali metal salts of a hydrocarbyl-substituted carboxylic acid and a hydrocarbyl-substituted sulfonic acid, then the carboxylic acid comprises more than 50% of the acid equivalents of the mixture; and either (C-1) at least one magnesium overbased salt of an acidic organic compound provided that the lubricating composition is free of calcium overbased salts of acidic organic compounds; or (C-2) at least one calcium overbased salt of an acidic organic compound provided that the lubricating composition is free of magnesium overbased salts of acidic organic compounds.

U.S. Pat. No. 5,681,799 (Song et al., Oct. 28, 1997) is directed to an oil-soluble lubricating oil additive comprising at least one terminally unsaturated ethylene/alpha-olefin/diene interpolymer of 300 to 20,000 number average molecular weight substituted with mono- or dicarboxylic acid producing moieties (preferably dicarboxylic acid or anhydride moieties), wherein the terminal unsaturation comprises terminal ethenylidene unsaturation. The mono- and dicarboxylic acid or anhydride substituted interpolymers of this invention are useful per se as additives to lubricating oils, and can also be reacted with a nucleophilic reagent, such as amines, alcohols, amino alcohols and reactive metal compounds, to form products which are also useful lubricating oil additives, e.g., as dispersants.

SUMMARY OF THE INVENTION

Disclosed is a metal containing polymer composition comprising; a metal overbased imide or ester functionalized polymer prepared by reacting (A) a polymer comprising (A1) an acidic functionalized polymer or ester functionalized polymer comprising a polyolefin having attached or grafted acidic functionality or ester functionality, said polyolefin having a number average molecular weight of at least 500;

(A2) an acidic mixed ester-acid of a carboxy containing interpolymer, said interpolymer having a reduced specific viscosity of from about 0.05 to about 2 and being derived from at least two monomers, one of said monomers being a low molecular aliphatic olefin, styrene or substituted styrene wherein the substituent is a hydrocarbyl group containing from 1 up to 18 carbon atoms, and the other of said monomers being an alpha, beta-unsaturated aliphatic acid, anhydride or ester thereof, said ester being characterized by the presence within its polymeric structure of at least one of each of two pendant polar groups which are derived from the carboxy groups of said ester;

(a) a relatively high molecular weight carboxylic ester group, said carboxylic ester group having at least 8 aliphatic carbon atoms in the ester radical and (b) a relatively low molecular weight carboxylic ester group, said carboxylic ester group having no more than 7 aliphatic carbon atoms in the ester radical; wherein the molar ratio of (a):(b) is (1–20):1 or (A3) an ester functionalized polymer comprising a lactone comprising the reaction product of one or more hydroxyaromatic compounds which are hydrocarbyl-substituted; a carboxy-substituted carbonyl compound or a source thereof; and a carbonyl compound other than a carboxy-substituted carbonyl compound, or a source thereof;

(B) a metal overbased composition that contains reactive basic functionality comprising (B1) a metal overbased amine wherein the reactive basic functionality is a primary or secondary amino group, (B2) a metal overbased hydroxy substituted carboxylic acid wherein the reactive basic functionality is a hydroxy group, or (B3) a metal overbased dispersant wherein the reactive basic functionality is a primary or secondary amino group.

DETAILED DESCRIPTION OF THE INVENTION

The metal containing polymer composition is prepared by reacting (A) a polymer with (B) a metal overbased composition.

(A) The Polymer

Several different polymers are envisioned as comprising component (A). The first polymer, (A1) is an acidic functionalized polymer or ester functionalized polymer, the second polymer, (A2) is an acidic mixed ester-acid of a carboxy containing interpolymer and the third polymer (A3) is an ester functionalized polymer comprising a lactone.

(A1) The Acidic Functionalized Polymer or Ester Functionalized Polymer

The acidic functionalized polymer (A1) comprises a polyolefin having attached or grafted acidic functionality, said polyolefin having a number average molecular weight of at least 500. Component (A1) as an acid functionalized polymer is prepared by reacting a polyolefin with an unsaturated carboxylic acid; for example, the reaction of a polyolefin with maleic anhydride

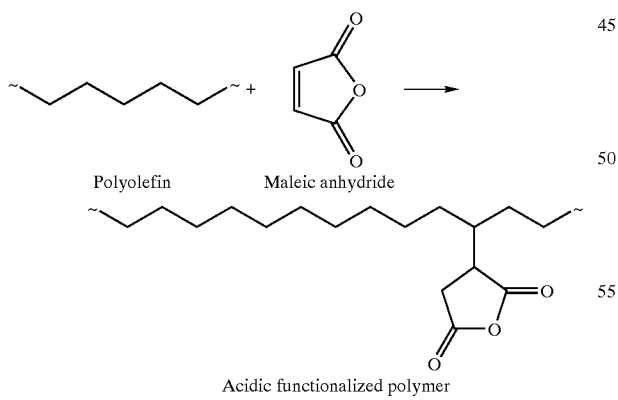

Acidic functionalized polymer

For the acidic functionalized polymer (A1), the acidic functionality is a carboxylic acid functionality that is derived from maleic anhydride or maleic acid.

The acidic functionalized polymer (A1) is also referred to as a substituted succinic acylating agent. The terms "substituent", "acylating agent" and "substituted succinic acylating agent" are to be given their normal meanings. For example, a substituent is an atom or group of atoms that have replaced another atom or group in a molecule as a result of a reaction. The terms acylating agent or substituted succinic acylating agent refer to the compound per se and does not include unreacted reactants used to form the acylating agent or substituted succinic acylating agent.

The ester functionalized polymer (A1) is a polyolefin having ester functionality. The ester functionality is present due to the reaction of the polyolefin and an ester or by the esterification of the acidic functionalized polymer. Component (A1) as an ester functionalized polymer is prepared by reacting a polyolefin with an unsaturated carboxylic acid ester; for example, the reaction of a polyolefin with an ester of maleic anhydride, maleic acid or fumaric acid wherein $R^{20}$ is each independently an aliphatic group containing from 1 to 18 carbon atoms.

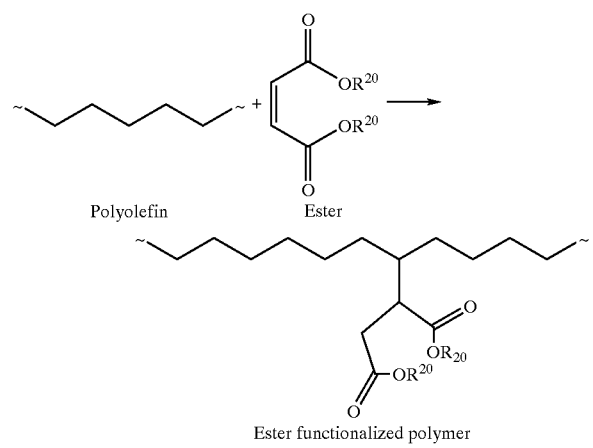

Ester functionalized polymer

It is also possible to form an ester functionalized polymer (A1) from the acidic functionalized polymer.

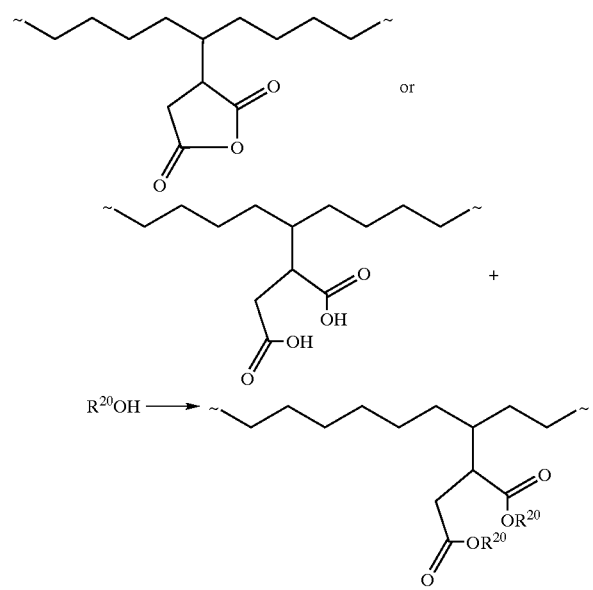

Another example of an ester functionalized polymer (A1) comprises a polyolefin having attached or grafted ester functionality. Component (A1) as an ester functionalized polymer can be prepared by reacting a polyolefin with an ester of the formula

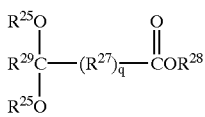

wherein each of $R^{29}$ and $R^{28}$ and each $R^{25}$ is independently hydrogen or an aliphatic group containing from 1 to 7 carbon atoms, $R^{27}$ is an alkylene group containing from 1 to 4 carbon atoms and q is 0 or 1. An especially preferred ester has $R^{29}$ as hydrogen and one $R^{25}$ as methyl, and the other $R^{25}$ and hydrogen, $R^{28}$ as methyl and q as zero to give

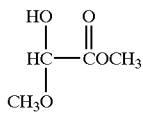

which is known as glyoxylic acid methylester methylhermiacetal (GMHA). It is marketed by DSM Fine Chemicals. The reaction for the preparation of the ester functionalized polymer (A1) is shown below.

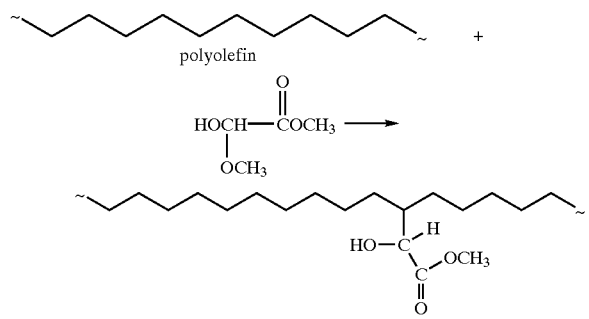

It is necessary that unsaturation be present in the polyolefin in order for the reaction with GMHA to occur.

As used in this specification and appended claims, the terms "hydrocarbyl" or "hydrocarbon-based" denote a group having a carbon atom directly attached to the remainder of the molecule and having predominantly hydrocarbon character within the context of this invention. Such groups include the following:

(1) Hydrocarbon groups; that is, aliphatic (e.g., alkyl or alkenyl), alicyclic (e.g., cycloalkyl or cycloalkenyl), aromatic aliphatic- and alicylic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, nitro, cyano, alkoxy, acyl, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen, and sulfur.

In general, no more than about three substituents or hetero atoms, preferably no more than one, and most preferably no hetero atoms will be present for each 10 carbon atoms in the hydrocarbyl group.

Terms such as "alkyl-based group", "aryl-based group" and the like have meaning analogous to the above with respect to alkyl and aryl groups and the like.

The polyolefin that is reacted with the acylating agent to form (A1) comprises an elastomeric polyolefin wherein the olefin contains up to 4 carbon atoms, an α-olefin polymer wherein the olefin contains from 6 to 24 carbon atoms, a random block copolymer comprising a mono-vinyl aromatic/diene copolymer or a hydrogenated random block copolymer comprising a mono-vinyl aromatic/diene copolymer or a star polymer.

The elastomeric polyolefins are polyethylene elastomer, polypropylene elastomer, ethylene/propylene elastomer, commonly known as ethylene/propylene rubber (EPR) and ethylene/propylene/diene elastomer (EPDM).

The polyethylene and polypropylene elastomers are represented below where G is hydrogen for polyethylene and —CH₃ for polypropylene.

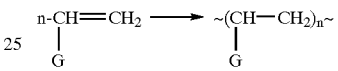

The polyolefin has a number average molecular weight ($\overline{M}_n$) between 20,000 and 500,000, often from about 20,000 to about 300,000. Molecular weights of the polymeric hydrocarbon polymer are determined using well-known methods described in the literature. Examples of procedures for determining the molecular weight are gel permeation chromatography (GPC) (also known as size-exclusion chromatography) and vapor phase osmometry (VPO). These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modern Size Exclusion Liquid Chromatography", John Wiley and Sons, New York, 1979.

A measurement which is complementary to a polymer's molecular weight is the melt index (ASTM D-1238). Polymers of high melt index generally have low molecular weight, and vice versa. The attached or grafted polymers of the present invention preferably have a melt index of up to 20 dg/min., more preferably 0.1 to 10 dg/min.

These publications are hereby incorporated by reference for relevant disclosures contained therein relating to the determination of molecular weight.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673 which is hereby incorporated herein by reference for relevant disclosures in this regard.

The ethylene/propylene elastomer is made by mixing the same or different mole amounts of ethylene and propylene and then copolymerizing the mixture to form a copolymer as below:

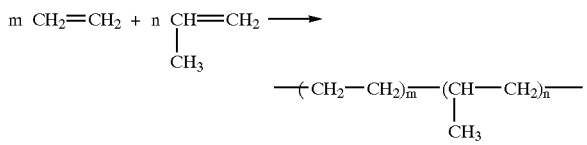

The ethylene/propylene elastomer may contain minor amounts, i.e., up to about 10% based on the molar amounts of monomeric ethylene and propylene units in the elastomer, of polymerized units derived from other monomers. Examples of such other monomers include polymerizable monoolefins having at least 4 carbon atoms such as 1-butene, 1-pentene, 2-butene, 3-hexane, 4-methyl-1-pentene, 1-decene, 1-nonene, 2-methyl-propene and 1-dodecene. They include also polyenes, i.e., those having 2 or more olefinic linkages, such as conjugated polyenes, for example, butadiene, isoprene, piperylene, 1,3-hexadiene, 1,3-octadiene, etc. There may further be non-conjugated polymers such as 3,3-dimethyl-1, 4-hexadiene, dicyclopentadiene, etc. For the most part, such other monomers preferably contain from 4 to about 10 carbon atoms although they may contain as many as 25 carbon atoms.

The ethylene/propylene elastomer is derived from about 2 to 98% weight ethylene with the remainder being propylene. Elastomers containing from about 20% to about 70% (molar) of polymerized propylene, from about 30% to about 80% of polymerized ethylene, and up to about 10% of another polymerized olefin are also useful.

The ethylene/propylene/diene elastomer has numerous sources. For example, Ortholeum® 2052 (a product marketed by DuPont Company), is a terpolymer having an ethylene:propylene weight ratio of about 57:43 and containing 4–5 weight % of groups derived from 1,4-hexadiene monomer. Other commercially available olefin/diene copolymers including ethylene-propylene copolymers with ethylidene norbornene, with dicyclopentadiene, with vinyl norbornene, with 4-vinyl cyclohexene, and numerous other such materials are readily available. Olefin-diene copolymers and methods for their preparations are described in numerous patents, including the following U.S. Pat. Nos. 3,291,780; 3,300,459; 3,598,738; 4,026,809; 4,032,700; 4,156,061; 3,320,019; 4,357,250.

The α-olefin polymers obtained herein are typically liquids having a viscosity of less than 150,000 cps at −40° C. The α-olefin monomers used to prepare the α-olefin polymers are described by the formula $R^{12}CH=CH_2$. The group $R^{12}$ is a hydrocarbyl residue containing from 6 to 16 carbon atoms. In particular, the α-olefin which contains 6 carbon atoms is preferably the simplest hydrocarbon species, e.g., 1-hexene. Thus, the particularly desirable α-olefin monomers do not contain a second reactive vinyl group, e.g., 1,4-hexadiene. It is further desirable that any additional unsaturation within the α-olefin monomer should also be minimized or eliminated.

Thus overall, the preferred species in the present invention is an (β-olefin which contains a simple vinyl group (olefin) at the terminus of the molecule (mono-alpha-olefin). Specific examples of a-olefins which may be utilized herein are 1-hexene, 1-heptane, 1-octene, 1-nonene, 1-decene, 1-undecene, 1-dodecene, 1-tridecene, 1-tetradecene, 1-pentadecene, 1-hexadecene, 1-heptadecene and 1-octadecene. Also useful are small amounts of non-vinyl olefins. Thus, materials such as 2-methyl-1-pentene $CH_3CH_2CH_2C(CH_3)=CH_2$ are useful herein. Typically non-vinyl olefins should not be present at more than about 10%, preferably 5% by weight of the total olefin charge. Preferably, the polyolefin will contain no non-vinyl olefins.

Branching in the olefin monomer away from the 1 and 2 carbon positions is also within the scope of the invention. While branched α-olefins are not desired, they may be included at less than 10%, preferably less than 5% by weight. Branched α-olefins include 3-methyl-1-pentene.

Particularly useful are mixtures of α-olefins. In particular, mixtures of the normal α-olefins: octene and dodecene; heptene and nonene; hexene and decene; and octene and tetradecene are useful when employed herein. Ternary mixtures such as the normal octene, dodecene and hexadecene may be used. A further desirable ternary mixture of α-olefins includes a mixture of the normal octene, dodecene and tetradecene.

Where binary mixtures of two cc-olefins are utilized, they are typically present at from 5% to 95%, preferably 10% to 90% by weight of each of the α-olefins. Where ternary mixtures are employed, each of the α-olefins will be utilized at from about 5% to about 90%, preferably about 10% to about 70% of each of the monomers.

The catalysts employed are a first catalyst system comprising a secondary tertiary organo halide and a second system employing a Lewis acid catalyst.

The tertiary organo halides are of the formula $R^{13}R^{14}R^{15}CX$ wherein X is halogen and $R^{13}$, $R^{14}$, and $R^{15}$ are hydrocarbyl groups. The value of X as halogen may be any of the typically employed halogen atoms, e.g., fluorine, chlorine, bromine or iodine. Preferably X is chlorine or bromine and most preferably is chlorine.

The $R^{13}$ through $R^{15}$ may be the same or different and preferably are the same and most preferably are alkyl. It is preferred that the total number of carbon atoms in the tertiary alkyl halide be from 4 to 12 carbon atoms. Preferred tertiary organo halides are t-butyl chloride and t-amyl chloride and a preferred secondary organo halide is sec-butyl chloride.

The Lewis acid catalyst is any material which catalyzes the desired reaction to obtain the α-olefin polymer and which is further described as a molecule or ion that can combine with another molecule or ion by forming a covalent bond with two elections from the second molecule or ion. Specific examples of Lewis acid catalysts useful in preparing the α-olefin polymers are boron trifluoride, aluminum halides such as aluminum chloride, aluminum monochlorodibromine, aluminum bromide and aluminum monobromodichloride.

An aprotic solvent is typically utilized in preparing the α-olefin polymers. The solvent is a normally liquid material at 20° C. The solvent is also preferably a halogenated hydrocarbon. Typically, the solvent will be methylene chloride. Other solvents comprise monobromomonochloromethane; methylene bromide, 1,2-dichloroethane; 1,1-dibromocyclopropane; 1,1-dichlorocyclopropane; cis-1,2-dichlorocyclopropane; trans-1,2-dichlorocyclopropane; cis-1,2-dibromocyclopropane and trans-1,2-dibromocyclopropane.

The solvents utilized herein are preferably general dichloro compounds such as ethylene dichloride or methylene chloride.

A further feature is to conduct the polymerization reactions in the presence of an activating amount of a protic compound. Hydrocarbon solvents can also be used as protic compounds, as well as nitro-methane and halogenated aromatics such as dichlorobenzene. Typically, the protic compound is water. An activating amount of the protic compound is typically less than 1%, preferably 0.0001% to 0.1% by weight of the catalyst system. The term "activating amount" means that amount which promotes the overall polymerization reaction and is not such an amount as to substantially decrease the polymerization reaction or to inactivate the catalyst system.

Typically, the number average molecular weight of the α-olefin polymers obtained will be from 2,000 to 100,000 (Mn).

The random block copolymer comprising the mono-vinyl aromatic/diene copolymer comprises the simultaneous copolymerization of two monomers. One monomer is a conjugated diene and the other monomer is a mono-vinyl aromatic. The random block copolymer formed will contain double bonds and may then be hydrogenated to remove some or substantially all of the unsaturation. In the formation of the ester functionalized polymer (A1), it is necessary that unsaturation be present in the polyolefin such that a reaction with GMHA can occur.

Examples of vinyl substituted aromatics include styrene, alpha-methylstyrene, ortho-methylstyrene, meta-methylstyrene, para-methylstyrene, para-tertiary-butylstyrene, with styrene being preferred. Examples of conjugated dienes include piperylene, 2,3-dimethyl-1,3-butadiene, chloroprene, isoprene and 1,3-butadiene with isoprene and 1,3-butadiene being particularly preferred. Mixtures of such conjugated dienes are useful.

The vinyl substituted aromatic monomer content of these random block copolymers is in the range of from about 20 percent to about 70 percent by weight and preferably from about 40 percent to about 60 percent by weight. Thus, the aliphatic conjugated diene monomer content of these copolymers is in the range of from about 30 percent to about 80 percent by weight and preferably from about 40 percent to about 60 percent by weight.

What follows is a discussion on the different types of random block copolymers.

I. Random Copolymers: Those in which the comonomers are randomly, or nearly randomly, arranged in the polymer chain, with no significant degree of blocking homopolymer segments of either monomer. The general polymer structure of a random copolymer can be represented by:

-S-D-D-S-D-S-S-D-S-D-S-S-D-S-S-D-D-S-D-D-S-D- wherein S denotes a vinyl aromatic monomer such as styrene, and D denotes a conjugated diene monomer such as 1,3-butadiene or isoprene. Such random copolymers, may easily be made by free radical copolymerization.

While the diene monomer introduces an olefinic unsaturation of some sort, either in the main backbone of the polymer, or pendant on it, it is to be understood that the olefinic sites may be substantially removed by hydrogenation.

II. Regular Linear Block Copolymers: Those in which a small number of relatively long chains of homopolymer of one type of monomer are alternately jointed to a small number of relatively long chains of homopolymer of another type of monomer. Normal, or regular, block copolymers usually have from 1 to about 3, preferably only from 1 to 2 relatively large homopolymer blocks of each monomer. Thus, a linear regular diblock copolymer of styrene or other vinyl aromatic monomer S and conjugated diene D would have a general structure represented by a large block of homopolymer S attached to a large block of homopolymer D:

SSSSSSSSSSSSS--DDDDDDDDDDDDDDDDDDDD

The blocks of monomer S and monomer D are not necessarily of the same size or molecular weight. As before, it is understood that the initial olefinic unsaturation introduced into the copolymer by diene monomer D has been substantially removed by hydrogenation. Linear diblock copolymers comprising hydrogenated poly-(styrene-b-isoprene) are sold under the trade names "Shellvis 40, 50 and 90" by Shell Chemical Company.

In like manner, regular triblock copolymers are understood as having three relatively large major blocks, or segments of homopolymer composed of either two monomers; i.e., as in:

SSSSSSSSSSSS-DDDDDDDDDDD-SSSSSSSSSSSSSS and,

DDDDDDDDDDD-SSSSSSSSSSSSSS-DDDDDDDDDDDDD

A third monomer A may also be incorporated in these linear, regular block copolymers. In this instance, several configurations are possible, depending on how the homopolymer segments are incorporated with respect to each other. For example, a linear triblock copolymer of monomers S, D and A could be represented by several different configurations:

DDDDDDDDDDD-AAAAAAAAAAAAAAA-SSSSSSSSSSSSSS,

DDDDDDDDDDD-SSSSSSSSSSSSSS-AAAAAAAAAAAAAA, or,

AAAAAAAAAAA-DDDDDDDDDDDDDD-SSSSSSSSSSSSSS.

III. Linear Random Block Copolymers: Those in which a relatively large number of relatively short segments of homopolymer of one type of monomer alternate with a relatively large number of short segments of homopolymer of another monomer type.

Random block polymers of this invention may be linear, or they may be partially, or highly branched. The relative arrangement of homopolymer segments in a linear random block polymer, which is the most preferred block polymer of this invention, may be represented by:

-DDDD-AAAAA-DDD-AA-DDDDD-AAA-DD-AAAAAA-DDDwherein D represents a conjugated diene monomer, and A represents a vinyl aromatic monomer. The arrangement of the individual homopolymer segments of each type of monomer in a linear random block polymer is alternating.

IV. Linear Tapered Random Block Copolymers:

A special type of configuration in linear random block copolymers is the linear tapered random block structure. In this arrangement, a major portion of the polymer backbone is of the random block type, with larger blocks of one type of homopolymer situated at one end of the molecule. The synthesis of this type of polymer is usually carried out by preparing a linear random block copolymer, then adding more of one of the monomer types near the end of the polymerization, so that the additional polymer forms a series of ever larger homopolymer blocks at the end of the growing linear polymer chain. The vinyl substituted aromatic monomer is generally chosen to provide the larger, tapered homopolymer blocks, although other types of monomers may be used for this purpose.

SSSSSSSSSSSSSSSSSSS-DD-SSSSS-DDD-SSS-DDD-SS-DDDD

Linear tapered random block copolymers may have significantly different solubilities in diluents normally used in lubricant formulations, as well as superior thickening power at high temperature, better high temperature viscosity under conditions of high shear, and improved low temperature viscometrics, compared to simple random block copolymers of similar molecular weight, made from the same monomers.

In general, it is preferred that these block copolymers, for reasons of oxidative stability, contain no more than about 5 percent and preferably no more than about 0.5 percent residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation as determined by the aforementioned analytical techniques.

The random block copolymers typically have a number average molecular weight in the range of about 5,000 to about 1,000,000; preferably about 30,000 to about 300,000. The weight average molecular weight for these copolymers is generally in the range of about 50,000 to about 500,000; preferably about 30,000 to about 300,000.

Hydrogenation of the unsaturated block polymers obtained initially as polymerization products produces polymers that are more oxidatively and thermally stable. Reduction is typically carried out at part of the polymerization process, using finely divided, or supported, nickel catalyst. Other transition metals may also be used to effect transformation. Hydrogenation is normally carried out to the extent of reducing approximately 94–96% of the olefinic unsaturation in the initial polymer. This means that the manner in which the diene monomer incorporates becomes an important parameter affecting the final physical and solution properties of the hydrogenated polymers at ambient and low temperatures. The figure below shows diene incorporated both in a 1,4-cis and 1,2-manner. Hydrogenation of a 1,4-cis configuration produces linear polyethylene segments in the polymer, reducing solubility in general, and introducing highly crystalline sites that tend to associate at low temperatures, and introduce potentially undesirable melt-associated thermal transitions.

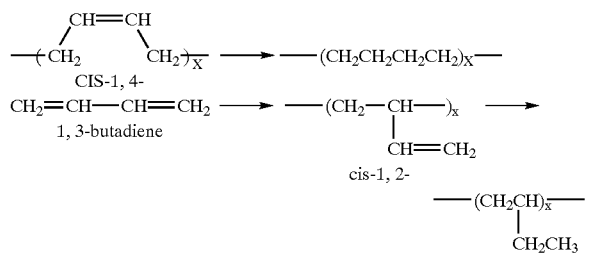

In contrast, hydrogenation of the olefin introduced by 1,2-polymerization of the diene results in a pendant alkyl group that enhances solubility, decreases crystallinity in the diene segments, and substantially reduces the tendency toward association. The ability to control the balance of 1,4- and 1,2-modes of diene monomer incorporation, in order to optimize overall properties of the hydrogenated block polymer, for use as a viscosity modifier in lubricating oil compositions.

Isoprene incorporates into block polymers in a similar manner to that of 1,3-butadiene, i.e., either by 1,4-cis or 3,4-polymerization. As with 1,3-butadiene, predominantly cis-1,4-incorporation is usual in non-polar paraffinic solvents, but promoters, such as tetrahydrofuran, favor 3,4-polymerization. Again, a balance of properties may be achieved by using small amounts of electron-rich promoters to speed initiation and polymerization, and to influence the nature and properties of the final, hydrogenated polymer. With isoprene, there will be no possibility of formation of crystalline polyethylene segments on the hydrogenation, because there will always be aliphatic substituents in the polyisoprene blocks.

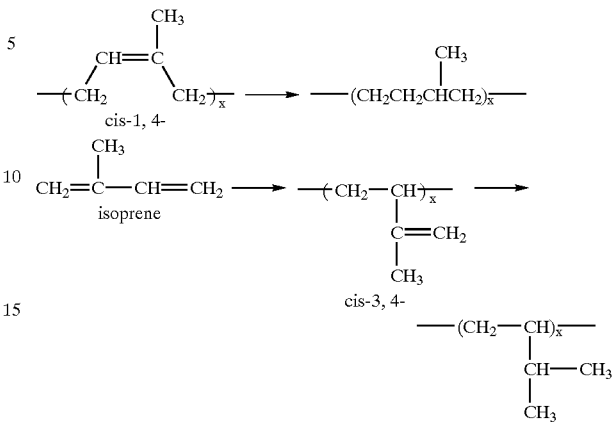

It can be seen, then that the physical and solution properties of block copolymers are dependent on both the monomers used, and the method of preparation. The morphological characteristics of polymer solutions are similarly dependent on polymer microstructure. Morphology refers to the actual conformation of polymers under a defined set of conditions, and is dependent on structure, polymer concentration, temperature, and additional influences of solvents and other agents. Many types of block polymers show a good deal of intermolecular associative behavior, wherein blocks, or segments, of like homopolymer may agglomerate. In this sense, the block polymers demonstrate a kind of surface-active nature,wherein they form micelles, similar to those formed by classical surfactants. Supporting this property are studies which have shown that block polymers have the ability to stabilize colloidal dispersions.

In general, polystyrene-block-polyisoprene hydrogenated diblock copolymers have two relatively large segments associated to a much greater degree than do random block polymers of similar composition and molecular weight. Typically, the diblock copolymer concentrate can contain no more than about 6% by weight, and the random block copolymer no more than about 8% to be pourable at 100° C.

In general, it is preferred that these block copolymers, for reasons of oxidative stability, contain no more than about 5 percent and preferably no more than about 0.5 percent residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation as determined by the aforementioned analytical techniques.

Examples of commercially available random block copolymers include the various Glissoviscal block copolymers manufactured by BASF. Two especially preferred copolymers are Glissoviscal® SGH and Glissoviscal® CE-5260.

Star polymers are polymers comprising a nucleus and polymeric arms. Common nuclei include polyalkenyl compounds, usually compounds having at least two non-conjugated alkenyl groups, usually groups attached to electron withdrawing groups, e.g., aromatic nuclei. The polymeric arms are often homopolymers and copolymers of conjugated dienes and monoalkenyl arenes and mixtures thereof.

The polymers thus comprise a poly(polyalkenyl coupling agent) nucleus with polymeric arms extending outward therefrom. The star polymers are usually hydrogenated such that at least 80% of the covalent carbon-carbon bonds are saturated, more often at least 90% and even more preferably, at least 95% are saturated.

The polyvinyl compounds making up the nucleus are illustrated by polyalkenyl arenes, e.g., divinyl benzene and poly vinyl aliphatic compounds.

Dienes making up the polymeric arms are illustrated by butadiene, isoprene and the like. Monoalkenyl compounds include, for example, styrene and alkylated derivatives thereof.

Star polymers are well known in the art. Such material and methods for preparing same are described in numerous publications and patents, including the following United States patents which are hereby incorporated herein by reference for relevant disclosures contained therein: U.S. Pat. Nos. 4,116,917; 4,141,847; 4,346,193; 4,358,565; and 4,409,120.

Star polymers are commercially available, for example, as Shellvis 200 sold by Shell Chemical Co.

In order to form (A1), the polyolefin is reacted with the unsaturated carboxylic acid. Typically, the unsaturated carboxylic acids are acrylic acid, fumaric acid, maleic anhydride and the like. Maleic anhydride is the preferred unsaturated carboxylic acid. Generally, the reaction involves heating the polyolefin and the unsaturated carboxylic acid at a temperature of about 120° C. to about 200° C. in the presence of a free radical initiator. Mixtures of these polyolefins as well as mixtures of unsaturated mono- and polycarboxylic acids can also be used. Alternatively, when an unsaturated polyolefin is present, the reaction to form (A1) may be conducted thermally (up to 200° C.) or in the presence of chlorine gas.

In the reaction of the polyolefin with the unsaturated carboxylic acid, the carboxylic acid is present within the acid functionalized polymer (A1) at from 0.001 to about 5%.

In another alternative, unsaturated polyolefins can be reacted with glyoxylic reactants such as GMHA or glyoxylic acid.

The following examples illustrate the preparation of (A1). Unless otherwise indicated, in these examples and in other parts of this specification, as well as in the appended claims, all parts and percentages are by weight.

EXAMPLE (A1)-1

Tetrachloroethylene (3 liters) is passed through a silica gel column, sparged with nitrogen and then added under nitrogen to a dry reaction flask at 25° C. Agitation is begun and an equimolar mixture of gaseous ethylene and propylene is introduced below the tetrachloroethylene liquid surface at a rate of 100 ml per second until a saturated monomer solution is obtained, the excess of gas being allowed to escape through a gas outlet tube. To this saturated monomer solution there is added 8 ml (0.0128 mole) of a 1.6 molar solution of aluminum triisobutyl in cyclohexane and 0.94 ml (0.010 mole) of vanadyl trichloride, separately and rapidly in turn, by means of syringes, through an opening in the reactor sealed with a soft rubber cap. The tetrachloroethylene solution turns to a soft clear amber color and the temperature rises to about 40° C. after a minute. To the agitated reaction mixture at 35–40° C., an equimolar mixture of gaseous ethylene and propylene is introduced at a rate of 100 ml per second over a period of 0.5 hours. To the reaction mixture there is added 5 ml of n-butanol and the polymer separates as a rubbery, swollen solid which is squeezed free of excess solvent, washed several times with fresh n-butanol and dried. The copolymer thereby obtained has a propylene content of 20 mole percent and a number average molecular weight of 250,000.

A portion of the copolymer is mixed with 1% (by weight of the copolymer) of maleic anhydride and the mixture is heated to 200° C. for 3 hours to form an acidic functionalized polymer.

EXAMPLE (A1)-2

A solution of 30 g (0.15 mole) of aluminum triisobutyl and 84 g (0.6 mole) of decene-1 in 200 ml of tetrachloroethylene is heated at reflux under a nitrogen atmosphere for 2 hours to form aluminum tridecyl. The solution is cooled to room temperature and blended with 1800 ml of tetrachloroethylene, presaturated with an ethylene-propylene gas mixture containing 75 mole percent of propylene. The ethylene-propylene gas mixture (75 mole percent propylene) is fed into the tetrachloroethylene solution at a rate of 37.5 ml per second. Introduction of ethylene and propylene is continued as a solution of 4.35 g (0.025 mole) of vanadyl chloride in 100 ml of tetrachloroethylene is added to the reaction mixture with vigorous stirring at 29–41° C. over a period of 2 minutes. The catalyst forms a clear violet solution and rapid absorption of the gas feed commences. Thereafter, 30 ml (0.108 mole) of a 3.6 molar solution of 1,4-hexadiene in tetrachloroethylene is added over a period of 9 minutes to the reaction mixture at 41–48° C. The feed of ethylene and propylene is continued and 53.4 ml (0.192 mole) more of the 3.6 molar 1,4-hexadiene solution is added to the reaction mixture over a period of 2 hours at 38–40° C. Then 6.1 ml of n-butanol is added to the reaction mixture causing precipitation of the copolymer. The precipitate is slurried with acetone in a blender and then dried on a rubber mill at 50° C. The product (97 g) is a soft, rubbery terpolymer which has a propylene content of 42 mole percent, a diene content of 1.2 mole percent corresponding to an iodine number of 8.9, and by difference, an ethylene content of 56.8 mole percent. The terpolymer has a reduced specific viscosity (RSV) of about 2.1, corresponding to a number average molecular weight of 125,000.

A solution of 500 g of this copolymer is mixed with 2000 g of diphenyl oxide and 1830 g of this mixture is mixed with maleic anhydride (41 g) at 230° C. for 4 hours and then heated at 200° C. and 1 mm mercury to remove volatile components to give 383 g of a residue.

EXAMPLE (A1)-3

A product is obtained by the procedure essentially the same as that of Example (A1)-2 from these reactants: the copolymer of Example (A1)-2 and maleic anhydride (10% by weight of the copolymer).

EXAMPLE (A1)-4

The procedure of Example (A1)-2 is essentially repeated, except that the maleic anhydride employed is 5% by weight of the copolymer.

EXAMPLE (A1)-5

The procedure of Example (A1)-2 is essentially repeated, except that the maleic anhydride employed is 4.4% by weight of the copolymer.

EXAMPLE (A1)-6

One gallon (3000 g) of a 9 weight percent solution of an ethylene-propylene copolymer made by the Ziegler Natta process using hydrogen moderated $VOCl_3$/aluminum sesquechloride catalyst, the copolymer containing about 54 weight percent ethylene and 46 weight percent propylene having an Mn of 60,000 in solvent 100 Neutral oil is heated to 180° C., under a nitrogen blanket. To this is added with stirring 11.25 g (0.4 percent by weight of the copolymer) maleic anhydride and 2.7 g of 2,5-dimethyl-hex-3-yne-2,5-bis-tertiary-butyl peroxide. After 5 hours of maintaining the temperature at 180° C., the contents are sparged with nitrogen for 2 hours to remove any of the unreacted maleic anhydride.

EXAMPLE (A1)-7

Added to a 12 liter 4 neck flask is 5950 parts of diluent oil. The contents are heated and stirred to 160° C. and slowly added are quarter-inch chunks of an ethylene-propylene copolymer identified as Mitsui Opheus 1010 OCP. The copolymer is added to the hot oil until 1050 parts have been introduced over a three-hour period. Once the polymer is dissolved, the temperature is lowered to 130° C. and added are 15.3 parts (0.32 equivalents) maleic anhydride. This is followed by an addition of 15.3 parts t-butylperoxybenzoate in 20 parts toluene over a one-hour period. The contents are maintained at this temperature for 2 hours. The contents are then stripped of volatile solvents to 160° C. while blowing with nitrogen at 2.5 cubic feet per hour to give a product containing 0.22 percent by weight of maleic anhydride.

EXAMPLE (A1)-8

A 100-gallon (397 liter) reactor is equipped with a mechanical stirring system, monomer reservoir and feed inlet, thermometer, condenser, cooling jacket and $N_2$ atmosphere. A solution consisting of 69 kg 1-octene, 69 kg 1-dodecene and 1.1 kg tertiary butyl chloride is charged to the monomer feed reservoir. Water is present at about 0.25% weight of the total charge. To the stirred reactor is charged 89 kg dry methylene chloride and 3.45 kg anhydrous $AlCl_3$. This $AlCl_3$ slurry is cooled to 10° C., where upon a dropwise addition of the co-monomer/t-butyl chloride solution is initiated via the monomer feed inlet into the reactor over 3.5 hours. The polymerization temperature is maintained between 15°–20° C. After the co-monomer/t-butyl chloride charge is complete, the polymerization mixture is stirred for an additional 1.5 hours at 15°–20° C.

The polymerization mixture is warmed to room temperature with stirring. The $AlCl_3$ catalyst is neutralized by adding 28% aqueous NaOH solution into the product mixture with stirring at room temperature. After catalyst neutralization, the aqueous and organic phases were separated. The organic phase is stripped of solvent at 150° C. and filtered to give a 92% yield of a liquid 1-olefin copolymer having a bulk viscosity at 100° C. of 240 cSt. Gel permeation chromatography (polyisobutylene standard) indicates a copolymer Mn=4850, Mw=18800. A 20% wt. copolymer treatment of a 100N mineral oil gives a kinematic viscosity at 100 C. of 12.6 cSt.

A portion of the copolymer is mixed with 1.5% (by weight of the copolymer) of maleic anhydride and the mixture is heated to 200° C. for 3 hours to form an acidic functionalized polymer.

EXAMPLE (A1)-9

A five-liter reactor is equipped with a stirrer, addition funnel, thermometer, condenser and a cooling bath. A solution of 1000 g (8.93 moles) 1-octene, 1000 g (5.95 moles) 1-dodecene and 40.0 g (0.375 moles) tertiary amyl chloride is prepared and charged to the addition funnel. To the reactor is charged 1000 ml. dry methylene chloride and 50.0 g anhydrous $AlCl_3$. A $N_2$ atmosphere is maintained throughout the polymerization procedure. The stirred $AlCl_3$ slurry is cooled to 5° C., whereupon a dropwise addition of the comonomer/t-butyl chloride solution is initiated and continued over 1.25 hours into the reactor. The polymerization temperature is maintained between 5°–10° C. After the comonomer/t-butyl chloride charge is complete, the polymerization mixture is stirred for an additional 1.5 hours at 5°–10° C.

The polymerization mixture is warmed to room temperature with stirring. The catalyst is neutralized by adding a water/MeOH solution dropwise. The product is then dried by $Na_2SO_4$, filtered and the solvent removed to give a 90% yield of a liquid 1-olefin copolymer having a bulk viscosity at 100° C. of 250 cSt. Gel permeation chromatography (polyisobutylene standard) indicates an Mn=4000, Mw−=5000. A treatment of 20% wt. Of this copolymer in a mineral oil blend gives a kinematic viscosity at 100 C. of 13.1 cSt.

A portion of the copolymer is mixed with 1.8% (by weight of the copolymer) of maleic anhydride and the mixture is heated to 190° C. for 3.5 hours to form an acidic functionalized polymer.

EXAMPLE (A1)-10

A five-liter reaction vessel is equipped as in Example (A1)-9. A solution of 500 g (4.46 moles) 1-octene, 500 g (2.98 moles) 1-dodecene and 17.2 g (0.186 moles) tertiary butyl chloride is prepared and charged to the addition funnel. To the reaction vessel is charged 500 ml. dry methylene chloride and 24.8 g (0.186 moles) anhydrous $AlCl_3$. An $N_2$ atmosphere is maintained throughout the polymerization. The stirred $AlCl_3$ slurry is cooled to 15° C., whereupon a dropwise addition of the comonomer/t-butyl chloride solution is initiated and continued over 2 hours into the reactor. The polymerization temperature is maintained between 15°–20° C. After the comonomer/t-butyl chloride charge is complete, the polymer mixture is stirred for an additional 1.5 hours at 15°–20° C.

The polymer mixture is warmed to room temperature with stirring. The catalyst is deactivated by adding a stoichiometric excess of a $H_2O$/MeOH solution (based on the catalyst concentration) dropwise. The neutralized polymer solution is then dried of $H_2O$, filtered and solvent evaporated to give a 90% yield of a liquid olefin copolymer having a bulk viscosity at 100° C. of 197 cSt. GPC analysis using a polyisobutylene standard, indicates a Mm=4000, Mw=16000. A treatment of 20% wt. of this copolymer product in 100N mineral oil gives a kinematic viscosity of 12.0 cSt.

A portion of the copolymer is mixed with 2.5% (by weight of the copolymer) of maleic anhydride and the mixture is heated to 205° C. for 3 hours to form an acidic functionalized polymer.

EXAMPLE (A 1)-11

A two-liter reaction vessel is equipped as in Example (A1)-9. A solution of 200 g (1.786 moles) 1-octene, 200 g (1.190 moles) 1-dodecene, 200 g (0.893 moles) 1-hexadecene and 9.0 g (0.097 moles) tertiary butyl chloride is prepared and charged to the addition funnel. To the reaction vessel is charged 300 ml. dry methylene chloride and 12.9 g anhydrous $AlCl_3$. An $N_2$ atmosphere is maintained throughout the polymerization. The stirred $AlCl_3$ slurry is cooled to 15° C., whereupon a dropwise addition of the termonomer/t-butyl chloride solution is initiated and continued over two hours into the cooled AlCl₃ catalyst slurry. The polymerization temperature is maintained between 15°–20° C. After the termonomer/t-butyl chloride charge is complete, the polymer mixture is stirred for an additional 1.5 hours at 15°–20° C.

The polymerization mixture is warmed to room temperature with stirring. The catalyst is deactivated by adding a slight stoichiometric excess of methanol dropwise into the reactor. The neutralized polymer solution is vacuum stripped of solvent, then filtered to give a 86% yield of a liquid 1-olefin permeation chromatography analysis using a polyisobutylene standard, indicates a Mn=3600, Mw=12000 for this terpolymer system.

A portion of the copolymer is mixed with 2.5% (by weight of the copolymer) of maleic anhydride and the mixture is heated to 205° C. for 3 hours to form an acidic functionalized polymer.

EXAMPLE (A1)-12

A reactor equipped with a stirrer, N₂ inlet and a thermocouple is charged with 5950 parts of a 100N mineral oil (Petro-Canada) followed by heating, under nitrogen to 160° C. To the heated oil is added 1050 parts of an ethylene-propylene-diene copolymer having about 51 mole % ethylene groups and 2 mole % ethylidene norbornadiene groups, about one carbon to carbon double bond per 7300 molecular weight units. The addition is accomplished over 3 hours while maintaining 160° C. with N₂ blowing. The contents are then maintained at 160° C. with N₂ blowing for 12 hours to give a polymer solution. Added to a second reactor is 2800 parts of the polymer solution. The contents are heated to 110° C. and added is 11.2 parts methyl gloxylate methyl hemiacetal, 1.96 parts methanesulfonic acid and 2 drops of silicone antifoam. The contents are heated to 145° C. over 0.75 hours and maintained at this temperature for 6 hours. The contents are stripped at 145° C. at 12–15 millimeters of mercury to give the ester functionalized polymer (A1).

(A2) The Acidic Mixed Ester Acid Interpolymer

The acidic mixed ester-acid of a carboxy containing interpolymer, wherein the interpolymer has a reduced specific viscosity of from about 0.05 to about 2 is derived from at least two monomers. One monomer is a low molecular aliphatic olefin, styrene or substituted styrene wherein the substituent is a hydrocarbyl group containing from 1 up to 18 carbon atoms. The other monomer is an alpha, beta-unsaturated aliphatic acid, anhydride or ester thereof, said mixed acid ester containing titratable acidity and being characterized by the presence within its polymeric structure of a pendant polar group which is derived from the carboxy groups of said ester:

(a) a relatively high molecular weight carboxylic ester group, said carboxylic ester group having at least 8 aliphatic carbon atoms in the ester radical.

In a preferred embodiment, there is also present (b) a relatively low molecular weight carboxylic ester group, said carboxylic ester group having no more than 7 aliphatic carbon atoms in the ester radical; wherein the molar ratio of (a):(b) is (1–20):1.

A preferred element of the acidic mixed ester-acid is that with respect to the ester that the ester is a mixed ester, i.e., one in which there is the combined presence of both a high molecular weight ester group and a low molecular weight ester group, particularly in the ratio as stated above. Another essential element is that the ester-acid contains titratable acidity, that is, all of the acidic groups are not esterified, that some acidic groups are present.

In reference to the size of the ester groups, it is pointed out that an ester radical is represented by the formula

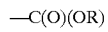

and that the number of carbon atoms in an ester radical is thus the combined total of the carbon atom of the carbonyl group and the carbon atoms of the ester group, i.e., the (OR) group.

For convenience, the relative proportions of the high molecular weight ester group (a) to the low molecular weight ester group (b) is expressed in terms of molar ratios of (1–20):1, preferably of (2–10):1 and most preferably of (2.5–5):1.

While interpolymers having a reduced specific viscosity of from 0.05 to about 2 are contemplated for component (A2), the preferred interpolymrers are those having a reduced specific viscosity of from 0.3 to about 1. In most instances, interpolymers having a reduced specific viscosity of from about 0.5 to about 1 are particularly useful.

From the standpoint of utility, as well as for commercial and economical reasons, mixed ester acids in which the high molecular weight ester group has from 8 to 24 aliphatic carbon atoms and the low molecular weight ester group has from 3 to 5 carbon atoms are preferred. Specific examples of the high molecular carboxylic ester group, i.e., the (OR) group of the ester radical (i.e., —(O)(OR)) include heptoxy, isooctoxy, decoxy, dodecoxy, tridecoxy, pentadecoxy, octadecoxy, eicosoxy, tricosoxy, tetracosoxy, heptacosoxy, triacontoxy, hentriacontoxy, tetracontoxy, etc. Specific examples of low molecular weight groups include methoxy, ethoxy, n-propoxy, isopropoxy, n-butoxy, secbutoxy, isobutoxy, n-pentoxy, neo-pentoxy, n-hexoxy, cyclohexoxy, cyclopentoxy, 2-methyl-1-butoxy, 2,3-dimethyl-1-butoxy, etc. In most instances, alkoxy groups of suitable size, comprise the preferred high and low molecular weight ester groups.

The carboxy-containing interpolymers include principally interpolymers of α, β-unsaturated acids or anhydrides such as maleic anhydride or itaconic anhydride with olefins (aromatic or aliphatic) such as ethylene, propylene, styrene or isobutene. The styrene-maleic anhydride interpolymers are especially useful. They are obtained by polymerizing equal molar amounts of styrene and maleic anhydride, with or without one or more additional interpolymerizable comonomers. In lieu of styrene, an aliphatic olefin may be used, such as ethylene, propylene, isobutene. In lieu of maleic anhydride, acrylic acid or methacrylic acid or ester thereof may be used. Such interpolymers are known in the art and need not be described in detail here. Where an interpolymerizable comonomer is contemplated, it should be present in a relatively minor proportion, i.e., less than about 0.3 mole, usually less than about 0.15 mole, per mole of either styrene or maleic anhydride. Various methods of interpolymerizing styrene and maleic anhydride are known in the art and need not be discussed in detail here. For purpose of illustration, the interpolymerizable comonomers include the vinyl monomers such as acrylonitrile, methylacrylate, methylmethacrylate, acrylic acid, vinyl methyl ether, vinyl ethyl ether, vinyl chloride, isobutene, and the like.

The ester-acid of the carboxy-containing interpolymer are most conveniently prepared by first esterifying the carboxy-containing interpolymer with a relatively high molecular weight alcohol and a relatively low molecular weight alcohol to convert at least about 50% and no more than about 98% of the carboxy radicals of the interpolymer to ester radicals. More than one high molecular weight alcohol or low molecular weight alcohol may be used in the process; so also may be used commercial alcohol mixtures such as the so-called Oxo alcohols which comprise, for example, mixtures of alcohols having from 8 to about 24 carbon atoms. A particularly useful class of alcohols are the commercial alcohols or alcohol mixtures comprising octyl alcohol, decyl alcohol, dodecyl alcohol, tetradecyl alcohol, pentadecyl alcohol, eicosyl alcohol, and octadecyl alcohol. Other alcohols useful in the process are illustrated by those which, upon esterification, yield the ester groups exemplified above.

The extent of esterification, as indicated previously, may range from about 50% to about 98% conversion of the carboxy radicals of the interpolymer to ester radicals. In a preferred embodiment, the degree of esterification ranges from about 70% to about 85%.

The esterification can be accomplished simply by heating the carboxy-containing interpolymer and the alcohol or alcohols under conditions typical for effecting esterification. Such conditions usually include, for example, a temperature of at least about 80° C. preferably from about 150° C. to about 300° C., provided that the temperature be below the decomposition point of the reaction mixture, and the removal of water of esterification as the reaction proceeds. Such conditions may optionally include the use of an excess of the alcohol reactant so as to facilitate esterification, the use of a solvent or diluent such as mineral oil, toluene, benzene, xylene, or the like and an esterification catalyst such as toluene sulfonic acid, sulfuric acid, hydrochloric acid, phosphoric acid, or the like. These conditions and variations thereof are well known in the art.

A particularly desirable method of effecting esterification involves first reacting the carboxy-containing interpolymer with the relatively high molecular weight alcohol and then reacting the partially esterified interpolymer with the relatively low molecular weight alcohol. A variation of this technique involves initiating the esterification with the relatively high molecular weight alcohol and before such esterification is complete, the relatively low molecular weight alcohol is introduced into the reaction mass so as to achieve a mixed esterification. In either event, it has been discovered that a two-step esterification process whereby the carboxy-containing interpolymer is first esterified with the relatively high molecular weight alcohol so as to convert about 50% to about 75% of the carboxy radicals to ester radicals and then with the relatively low molecular weight alcohol to achieve the finally desired degree of esterification results in products which have unusually beneficial viscosity properties.

The following examples are illustrative of the preparation of (A2) of the present invention. Unless otherwise indicated, all parts and percentages are by weight.

EXAMPLE (A2)-1

A styrene-maleic anhydride interpolymer is obtained by preparing a solution of styrene (16.3 parts by weight) and maleic anhydride (12.9 parts) in a benzene-toluene solution (270 parts; weight ratio of benzene:toluene being 66.5:33.5) and contacting the solution at 86° C. in nitrogen atmosphere for 8 hours with a catalyst solution prepared by dissolving 70% benzoyl peroxide (0.42 part) in a similar 10 benzene-toluene mixture (2.7 parts). The resulting product is a thick slurry of the interpolymer in the solvent mixture. To the slurry there is added mineral oil (141 parts) while the solvent mixture is being distilled off at 150° C. and then at 150° C./200 mm. Hg. To 209 parts of the stripped mineral oil-interpolymer slurry (the interpolymer having a reduced specific viscosity of 0.72) there are added toluene (25.2 parts), n-butyl alcohol (4.8 parts), a commercial alcohol consisting essentially of primary alcohols having from 12 to 18 carbon atoms (56.6 parts) and a commercial alcohol consisting of primary alcohols having from 8 to 10 carbon atoms (10 parts) and to the resulting mixture there is added 96% sulfuric acid (2.3 parts). The mixture is then heated at 150°–160° C. for 20 hours whereupon water is distilled off. An additional amount of sulfuric acid (0.18 part) together with an additional amount of n-butyl alcohol (3 parts) is added and the esterification is continued until 95% of the carboxy radicals of the polymer has been esterified.

EXAMPLE (A2)-2

The procedure of Example (A2)-1 is followed except that the esterification is carried out in two steps, the first step being the esterification of the styrene-maleic interpolymer with the commercial alcohols having from 8 to 18 carbon atoms and the second step being the further esterification of the interpolymer with n-butyl alcohol.

EXAMPLE (A2)-3

The procedure of Example (A2)-1 is followed except that the esterification is carried out by first esterifying the styrene-maleic interpolymer with the commercial alcohol having from 8 to 18 carbon atoms until 70% of the carboxyl radicals of the interpolymer have been converted to ester radicals and thereupon continuing the esterification with any yet-unreacted commercial alcohols and n-butyl alcohol until 95% of the carbonyl radicals of the interpolymer have been converted to ester radicals.

EXAMPLE (A2)-4

An interpolymer (0.86 carboxyl equivalent) of styrene and maleic anhydride (prepared from an equal molar mixture of styrene and maleic anhydride and having a reduced specific viscosity of 0.69) is mixed with mineral oil to form a slurry, and then esterified with a commercial alcohol mixture (0.77 mole; comprising primary alcohols having from 8 to 18 carbon atoms) at 150°–160° C., in the presence of a catalytic amount of sulfuric acid until about 70% of the carboxyl radicals are converted to ester radicals. The partially esterified interpolymer is then further esterified with a n-butyl alcohol (0.31 mole) until 95% of the carboxyl radicals of the interpolymer are converted to the mixed ester radicals.

EXAMPLE (A2)-5

A styrene-maleic anhydride interpolymer is prepared having a reduced specific viscosity of 0.13. The interpolymer is present in toluene at 22.7 percent solution. To a 1 liter flask is charged 228 parts of the interpolymer and 54 parts of a $C_{12-18}$ alcohol in 80 parts toluene. The contents are heated to 100° C. and a solution of 29 parts $C_{8-10}$ alcohol and 2.7 parts methane sulfonic acid is added over 10 minutes. The contents are refluxed at 120° C. for 12 hours and then stripped of volatiles at 145° C. to give an acidic mixed ester acid interpolymer that is 90% esterified.

(A3) The Lactone

Two lactones are envisioned as having utility in this invention. The first lactone is the reaction product of a hydroxyaromatic compound, a carboxy-substituted carbonyl compound, or a source thereof, and a carbonyl compound other than a carboxy-substituted carbonyl compound, or a source thereof. The second lactone is the reaction of the game hydroxyaromatic compound and the same carboxy-substituted carbonyl compound. The second lactone does not employ formaldehyde as a second carbonyl compound. The first of these reactants is a hydroxyaromatic compound, at least some of the units of which are hydrocarbyl-substituted.

The aromatic group of the hydroxyaromatic compound can be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein pairs of aromatic nuclei making up the aromatic group share two points, such as found in naphthalene, anthracene, the azanaphthalenes, etc. Polynuclear aromatic moieties also can be of the linked type wherein at least two nuclei (either mono or polynuclear) are linked through bridging linkages to each other. Such bridging linkages can be chosen from the group consisting of carbon-to-carbon single bonds between aromatic nuclei, ether linkages, keto linkages, sulfide linkages, polysulfide linkages of 2 to 6 sulfur atoms, sulfinyl linkages, sulfonyl linkages, methylene linkages, alkylene linkages, di-(lower alkyl) methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages. In certain instances, more than one bridging linkage can be present in the aromatic group between aromatic nuclei. For example, a fluorene nucleus has two benzene nuclei linked by both a methylene linkage and a covalent bond. Such a nucleus may be considered to have 3 nuclei but only two of them are aromatic. Normally, the aromatic group will contain only carbon atoms in the aromatic nuclei per se, although other non-aromatic substitution, such as in particular short chain alkyl substitution can also be present. Thus methyl, ethyl, propyl, and t-butyl groups, for instance, can be present on the aromatic groups, even though such groups may not be explicitly represented in structures set forth herein.

This first reactant, being a hydroxy aromatic compound, can be referred to as a phenol. When the term "phenol" is used herein, however, it is to be understood, depending on the context, that this term need not limit the aromatic group of the phenol to benzene, although benzene may be the preferred aromatic group. Rather, the term is to be understood in its broader sense to include, depending on the context, for example, substituted phenols, hydroxy naphthalenes, and the like. Thus, the aromatic group of a "phenol" can be mononuclear or polynuclear, substituted, and can include other types of aromatic groups as well.

For such reasons as cost, availability, performance, etc., the aromatic group is normally a benzene nucleus, a lower alkylene bridged benzene nucleus, or a naphthalene nucleus. Most preferably, the aromatic group is a benzene nucleus.

This first reactant is a hydroxyaromatic compound, that is, a compound in which at least one hydroxy group is directly attached to an aromatic ling. The number of hydroxy groups per aromatic group will vary from 1 up to the maximum number of such groups that the hydrocarbyl-substituted aromatic moiety can accommodate while still retaining at least one, and preferably at least two, positions, at least some of which are preferably adjacent (ortho) to a hydroxy group, which are suitable for further reaction by condensation with aldehydes (described in detail below). Thus, most of the molecules of the reactant will have at least two unsubstituted positions. Suitable materials can include, then, hydrocarbyl-substituted catechols, resorcinols, hydroquinones, and even pyrogallols and phloroglucinols. Most commonly each aromatic nucleus, however, will bear one hydroxyl group and, in the preferred case when a hydrocarbyl-substituted phenol is employed, the material will contain one benzene nucleus and one hydroxyl group. Of course, a small fraction of the aromatic reactant molecules may contain zero hydroxyl substituents. For instance, a minor amount of non-hydroxy materials may be present as an impurity. However, this does not defeat the spirit of the invention, so long as the starting material is functional and contains, typically, at least one hydroxyl group per molecule.

The hydroxyaromatic reactant is similarly characterized in that at least some of the units of which are hydrocarbyl substituted. Typically, most or all of the molecules are hydrocarbyl substituted, so as to provide the desired hydrocarbon-solubility to the product molecules. If the hydroxyaromatic compound comprises bridged ring units, then substantially all such units are hydroxyl- and hydrocarbyl-substituted; that is, each ring unit which is linked by a bridging group to another ring unit will have at least one hydroxyl substituent and at least one hydrocarbyl substituent.

Preferably, the hydrocarbyl group is an alkyl group. Typically, the alkyl group will contain 8 to 400 carbon atoms, preferably 12 to 100 carbons. Alternatively expressed, the alkyl groups can have a number average molecular weight of 150 to 2000, preferably 200 to 1200.

In one preferred embodiment, at least one hydrocarbyl group is derived from polybutene. In another preferred embodiment, the hydrocarbyl group is derived from polypropylene. In a further preferred embodiment, the hydrocarbyl substituent is a propylene tetramer.

In yet another embodiment, the alkylphenol component is a mixture of alkyl phenols, wherein some molecules contain alkyl substituents of 4 to 8 carbon atoms, such as a tertiary-alkyl (e.g., t-butyl) group, and some molecules contain alkyl substituents of 8 to 400 carbon atoms.

More than one such hydrocarbyl group can be present, but usually no more than 2 or 3 are present for each aromatic nucleus in the aromatic group.

The attachment of a hydrocarbyl group to the aromatic moiety of the first reactant of (A3) can be accomplished by a number of techniques well known to those skilled in the art. One particularly suitable technique is the Friedel-Crafts reaction, wherein an olefin (e.g., a polymer containing an olefinic bond), or halogenated or hydrohalogenated analog thereof, is reacted with a phenol in the presence of a Lewis acid catalyst. Methods and conditions for carrying out such reactions are well known to those skilled in the art.

Specific illustrative examples of hydrocarbyl-substituted hydroxyaromatic compounds include hydrocarbon substituted-phenol, naphthol, 2,2'-dihydroxybiphenol, 4,4-dihydroxybiphenyl, 3-hydroxyanthracene, 1,2,10-anthracenetriol, and resorcinol; 2-t-butyl phenol, 4-t-butyl phenol, 2,6-di-t-butyl phenol, octyl phenol, cresols, propylene tetramer-substituted phenol, propylene oligomer (MW 300–800)-substituted phenol, polybutene ($M_n$ about 1000) substituted phenol, substituted naphthols corresponding to the above exemplified phenols, methylene-bis-phenol, bis-(4-hydroxyphenyl)-2,2-propane, and hydrocarbon substituted bis-phenols wherein the hydrocarbon substituents have at least 8 carbon atoms and up to 400 carbon atoms, for example, octyl, dodecyl, oleyl, polybutenyl, etc., sulfide- and polysulfide-linked analogues of any of the above, alkoxylated derivatives of any of the above hydroxy aromatic compounds, etc.

The first lactone of component (A3) is the reaction product of the above-described substituted hydroxyaromatic compound with each of two classes of carbonyl compounds.

The expression "carbonyl compound," as used herein, includes aldehydes and ketones. The first carbonyl compound component is a carboxy-substituted carbonyl compound. This material can be, in a typical embodiment, expressed by the formula

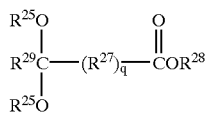

where each of $R^{29}$ and $R^{28}$ is independently hydrogen or an aliphatic group containing from 1 to 7 carbon atoms, $R^{27}$ is an alkylene group containing from 1 to 4 carbon atoms and q is 0 or 1. This first carbonyl component is disclosed above as an ester in the preparation of the ester functionalized polymer (A1). When $R^{29}$ is hydrogen, one $R^{25}$ is methyl and the other $R^{25}$ is hydrogen, $R^{28}$ is methyl and q is zero, the structure generated is glyoxylic acid methylester methyl-hemiacetal (GMHA).

When $R^{28}$ is an alkyl group (i.e., the compound is an ester-aldehyde) it is preferably a lower alkyl group, most preferably, ethyl or methyl. When $R^{29}$ is H, as is preferred, the aldehyde moiety of the above material may be hydrated, the hydrate serving a source of the carboxy-substituted aldehyde. For example, glyoxylic acid is readily available commercially as the hydrate having the formula

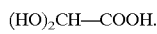

Water of hydration as well as any water generated by the condensation reaction is preferably removed during the course of the reaction.

In terms of manufacture, GMHA is a precursor to glyoxylic acid in a commercial process to make glyoxylic acid as shown below:

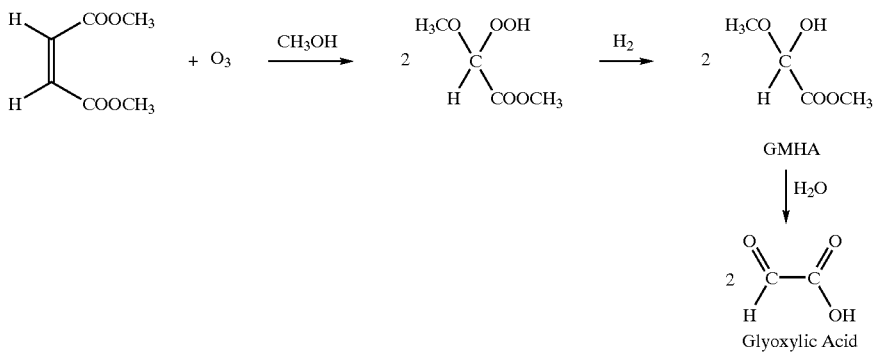

GMHA and glyoxylic acid are hereinafter referred to as a glyoxylic react ant.

Examples of materials which can suitably serve as the carboxy-substituted carbonyl compound include glyoxylic acid and other ω-oxoalkanoic acids, keto alkanoic acids such as pyruvic acid, levulinic acid, ketovaleric acids, and ketobutyric acids. Other carboxy substituents include esters such as ethyl-acetoacetate, amides, acyl halides, and salts.

The second class of carbonyl compound reactants in the present invention in the class of carbonyl compounds other than carboxy-substituted carbonyl compounds. Suitable compounds have the general formula RC(O)R', where R and R' are each independently hydrogen or a hydrocarbyl group, as described above, although R can include other functional groups (other than carboxy groups) which do not interfere with the condensation reaction (described below) of the compound with the hydroxyaromatic compound. This compound preferably contains 1 to 12 carbon atoms. Suitable aldehydes include formaldehyde, acetaldehyde, propionaldehyde, butyraldehyde, isobutyraldehyde, valeraldehyde, isovaleraldehyde, caproaldehyde, benzaldehyde, and higher aldehydes. Other aldehydes include dialdehydes, although monoaldehydes are generally preferred. The most preferred aldehyde is formaldehyde, which can be supplied as a solution, but is more commonly used in the polymeric form, as paraformaldehyde. Paraformaldehyde may be considered a reactive equivalent of, or a source for, an aldehyde. Other reactive equivalents may include hydrates or cyclic trimers of aldehydes. Suitable ketones include acetone, butanone, and other ketones where preferably one of the hydrocarbyl groups is methyl. More than one species of each class of carbonyl compound can be employed; for instance, adducts including formaldehyde, glyoxal, and glyoxylic acid are encompassed.

The first lactone of Component (A3) is generally a polymeric or oligomeric species which is prepared by reacting the three above-named components under condensing conditions. The hydroxyaromatic component and the aldehyde components (together) are generally reacted in molar ratios to provide a condensate of approximately a 1:1 aromatic:aldehyde composition, although deviations from this ratio may be employed if desired. Typically, the ratio of the hydroxyaromatic compound:carboxy-substituted aldehyde:other aldehyde is 2:(0.1 to 1.5):(1.9 to 0.5). Preferably the ratio is 2:(0.8 to 1.1):(1.2 to 0.9). The amounts of the materials fed to the reaction mixture will normally approximate these ratios, although corrections may need to be made to compensate for greater or lesser reactivity of one component or another, in order to arrive at a reaction product with the desired ratio of monomers. Such corrections will be apparent to the person skilled in the art.

The conditions under which the condensation reaction of the components is conducted are well-known condensing conditions. For example, the required amounts of reactants can be combined in a suitable reactor, optionally with an acidic catalyst and an inert solvent, and heated with removal of water of condensation. The reaction temperature can be from room temperature up to 250° C., depending on the solvents and reactivity of the starting materials and the temperature employed; typically temperatures of 100° to 200° C. are employed (to permit facile removal of water by distillation) or, preferably, 120°–180° C. The reaction will be continued until the expected quantity of water of condensation is removed, typically for 30 minutes to 24 hours, more commonly 2 to 8 hours. The reaction product can be isolated by conventional means.

It is speculated that the initially formed product contains hydroxyaromatic monomers adjacent to monomers derived from the condensation of the carboxy-substituted carbonyl compound, wherein the carboxy group is in an open or non-ring structure. Particularly when the carboxy group is in the form of the acid, this initial material will generally be converted, optionally upon further heating, to the closed, lactone, or ring structure. The resulting product will typically comprise at least some molecules containing the structures:

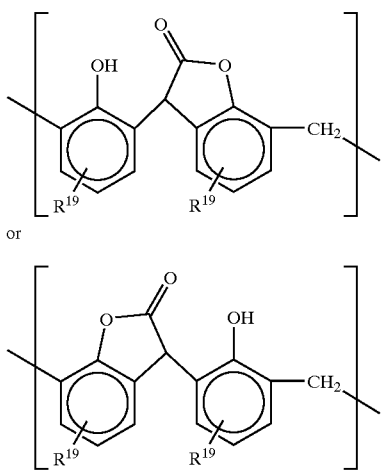

where, for purposes of illustration, the hydrocarbyl-substituted hydroxyaromatic moiety is derived from hydrocarbyl-substituted phenol, the carboxyl-substituted aldehyde moiety is derived from glyoxylic acid, and the other aldehyde moiety is derived from formaldehyde. In the above structures, $R^{19}$ is a hydrocarbyl group containing from 8 to 400 carbon atoms. In a preferred embodiment, at least some molecules of the composition will contain one or both of the structures illustrated above. In the above structures, the —$CH_2$— group shown on the right will normally be linked to another phenol moiety, which may be further similarly substituted with a bridging group or it may be linked to a phenol moiety which does not have further bridging functionality, thus terminating the molecule. The unattached bond shown on the left of the above structures may be linked to another bridging group; alternatively, it may represent the termination of the molecule by attachment to a hydrogen atom, hydrocarbyl group, or other non-bridging group. The above structures are not intended to suggest that all the bridging groups are necessarily positioned ortho to the oxygen atoms of the hydroxy or lactone groups. Depending on reaction conditions, it is also possible that some of the molecules can contain hydroxymethyl end groups (derived from formaldehyde) or even ether linkages within the chain. The preferred material is a substantially alternating oligomer with a structure similar to that illustrated above. By "substantially alternating" is meant that the phenol moieties alternate with carbonyl-derived moieties, whether of the carboxy-substituted or unsubstituted type. The different types of carbonyl-derived moieties may appear in a regularly alternating or in a random sequence (separated, in either case, by phenolic monomers), depending on their relative reactivities and the reaction conditions.

The length of the chain of monomers produced will depend on such reaction conditions as the relative ratios of the monomers employed. The minimum chain length for an appropriate condensation product would include 2 hydroxyaromatic units; the maximum chain length is not well defined and would be determined by considerations of suitable solubility in an oil medium. Typically, the chain of the product will contain 3 to 20 hydroxyaromatic units, preferably 4 to 10 such units, and more preferably 5 to 8 such units.

The second lactone is the reaction product of the hydroxyaromatic compound and the carboxy-substituted carbonyl compound, as already disclosed above in the first lactone.

This second type of coupled lactone structure is normally generated by the condensation of 2 moles of the aromatic compound and 1 mole of the glyoxylic reactant. Using hydrocarbyl phenol and GMHA as illustrative examples of reactants, the reaction can be represented by the following equation.

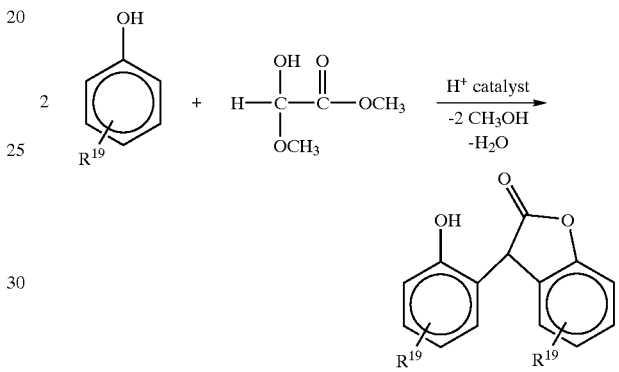

wherein $R^{19}$ is a hydrocarbyl group as defined above. However, compositions containing more than one lactone structure (i.e., overcouled composition) may also be present, especially in a process employing a reaction mixture more enriched in the glyoxylic reactant than a 2:1 molar ratio of the aromatic compound and glyoxylic reactant, i.e. less than a 2:1 molar ratio of the aromatic compound and the glyoxylic reactant. An illustrative example of an overcoupled lactone composition containing multiple lactone functionalities may be represented by the formulae

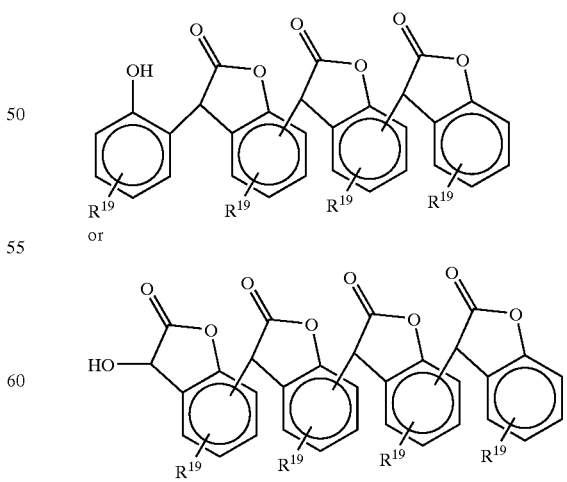

wherein R is a hydrocarbyl group and where GMHA is used illustratively as the glyoxylic reactant.

The following Example illustrates preparation of the condensation product of Component (A3):

EXAMPLE (A3)-1

Into a 12 L flask is charged 4400 g (4.0 moles) polyisobutenyl ($M_n$=950) substituted phenol that has been heated to 60° C., 592 g (4.0 moles) 50% aqueous glyoxylic acid, 132.0 g (4.0 moles) paraformaldehyde, and 9.0 g methanesulfonic acid (70%, aqueous), along with 1400 g stock diluent oil. The flask is equipped with a sub-surface nitrogen inlet, thermowell and Dean-Stark trap fitted with a condenser. The nitrogen flow is 0.2 cubic feet per hour. The contents are heated with stirring to 120° C. over a period of 0.5 hours, and then heated to 150° C. over 2 hours and held at 150° C. for 4 hours while collecting water. The contents are then stripped for 2 hours at 50 millimeters of mercury at 150° C. A total of 445 g water is obtained. An additional amount, 1903 g oil, is added and the contents are cooled to 140° C. and then filtered through a filter aid. analyses: saponification number 27.2, GPC $M_n$=3864, $M_w$=11135.

(B) The Metal Overbased Composition

Within this invention a metal overbased composition is utilized and the metal overbased composition contains reactive basic functionality. The term "reactive basic functionality" means that this functionality was present (attached to the overbased substrate) before overbasing and further that the reactive basic functionality did not enter into the overbasing reaction. An example of an overbased composition that contains reactive basic functionality is the overbasing of 12-hydroxystearic acid

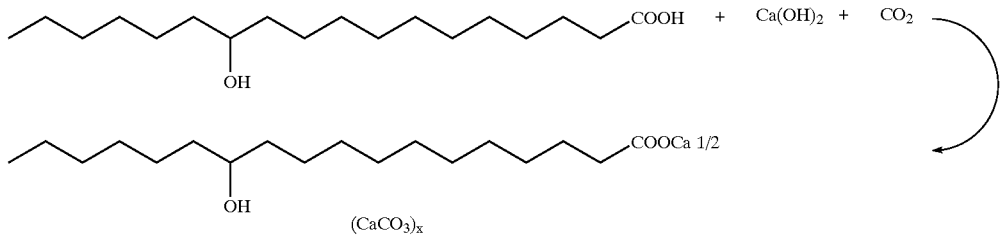

The 12-hydroxystearic acid is overbased using calcium hydroxide and carbon dioxide. A calcium salt of 12-hydroxystearic acid is formed along with calcium carbonate. The hydroxyl group is still present within the calcium salt. This hydroxyl group has reactive basic functionality.

Three different metal overbased compositions are envisioned as having reactive basic functionality within the present invention. They are:

(B1) a metal overbased amine wherein the reactive basic functionality is a primary or secondary amine;

(B2) a metal overbased hydroxy substituted carboxylic acid wherein the reactive basic functionality is a hydroxy group; and (B3) a metal overbased dispersant wherein the reactive basic functionality is a primary or secondary amine group.

The following is a discussion of each of (B1), (B2) and (B3).

The metal overbased amine, component (B1) is represented by the structure, $R^1R^2(B^1)(MA)_x$ wherein $R^1$ and $R^2$ are each independently hydrogen or a hydrocarbyl group, amino-substituted hydrocarbyl group, hydroxy-substituted hydrocarbyl group, alkoxy-substituted hydrocarbyl group, or amino groups, wherein the hydrocarbyl group contains from 4 to 50 carbon atoms, provided that $R^1$ and $R^2$ are not both hydrogen, $B^1$ is the reactive basic functionality comprising —NH, M is a metal, A is carbonate, sulfite, sulfate, thiosulfate, phosphite or phosphate and x is an integer of from 1.1 to 40.

The metal overbased amine (B1), wherein the reactive basic functionality is a primary or secondary amine, is prepared by overbasing an amine. Amines include monoamines and polyamines. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic-substituted alicyclic, and heterocyclic-substituted aromatic amines, and can be saturated or unsaturated. The amines can also contain non-hydrocarbon substituents or groups as long as these groups do not impart acidity to the molecule, as described above. Such non-hydrocarbon substituents or groups include lower alkoxy, lower alkyl mercapto, or interrupting groups such as —O— and —S— (e.g., as in such groups as —CH$_2$CH$_2$—X—CH$_2$CH$_2$ where X is —O— or —S—). For example, a useful amine is (N—C$_{16-18}$ alkyl propylene-diamine, available commercially as Duomeen™O. In general, the amine may be characterized by the formula $R^1R^2B^1$ wherein $B^1$ is —NH, $R^1$ and $R^2$ are each independently hydrogen or hydrocarbon, amino-substituted hydrocarbon, hydroxy-substituted hydrocarbon, alkoxy-substituted hydrocarbon, or amino groups, provided that $R^1$ and $R^2$ are not both hydrogen.

The amine should contain at least one carbon chain of at least 4 carbon atoms. Preferably, the hydrocarbyl group of this component will contain 8 to 50 and more preferably 12 to 26 carbon atoms. Accordingly, suitable groups include alkyl groups such as butyl, pentyl, hexyl, and preferably higher alkyl groups such as octyl (including 2-ethylhexyl), nonyl, decyl, undecyl, dodecyl, and similar higher alkyl groups e.g. 14, 16, 18, 20, 24, 26, or more carbon atoms. Both straight chain and branched groups can be used. Most such amines are commercially available. For example, N-alkyl trimethylenediamine is available from Akzo under the names Duomeen T™ and Duomeen C™. The alkyl groups can be substituted with other functional groups if desired, provided, however, that such functional groups do not provide any significant amount of acidic hydrogen character to the compound, as discussed above.

Monamines include mono-aliphatic and di-aliphatic substituted amines wherein the aliphatic group can be saturated or unsaturated and straight or branched chain. Thus, they are primary or secondary aliphatic amines. Such amines include, for example, mono- and di-alkyl-substituted amines, and mono- and di-alkenyl-substituted amines, and amines having one or more N-alkenyl substituent and N-alkyl substituent. Specific examples of such monoamines include n-butylamine, di-n-butylamine, allylamine, isobutylamine, cocoamine, stearylamine, laurylamine, methyllaurylamine, oleylamine, N-methyl-octylamine, dodecylamine, and octadecylamine. Examples of cycloaliphatic-substituted aliphatic amines, aromatic-substituted aliphatic amines, and heterocyclic-substituted aliphatic amines, include 2-(cyclohexyl)ethylamine, benzylamine, phenethylamine, and 3-(furyl-propyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, N-ethyl-cyclohexylamine, dicyclohexylamines, and the like. Examples of aliphatic-substituted, aromatic-substituted, and heterocyclic-substituted cycloaliphatic monamines include propyl-substituted cyclohexylamines, phenyl-substituted cyclopentylamines, and pyranyl-substituted cyclohexylamine.

Aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include substituted anilines, di-(paramethylphenyl)amine and naphthylamine. Examples of aliphatic-substituted, cycloaliphatic-substituted and heterocyclic-substituted aromatic monoamines are para-ethyoxyaniline, para-dodecylaminiline, cyclohexyl-substituted naphthylamine, and thienyl-substituted aniline.

Among the suitable nitrogen compounds are the polyamines. The polyamine may be aliphatic, cycloaliphatic, heterocyclic or aromatic. Examples of the polyamines include alkylene polyamines, N-alkylated alkylene polyamines, hydroxy containing polyamines, arylpolyamines, and heterocyclic polyamines.

N-alkylated alkylene polyamines are represented by the formula

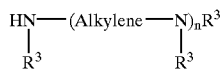

wherein n has an average value from 1, or 2 to 10, or to 7, or to 5, and the "Alkylene" group has from 1, or 2 to 10, or to 6, or to 4 carbon atoms. Each $R^3$ is independently hydrogen, or an aliphatic or hydroxy-substituted aliphatic group of up to 30 carbon atoms with the proviso that at least one $R^3$ is an aliphatic group of up to 30 carbon atoms. Additionally, within the repeating unit

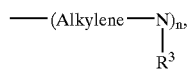

when n is 2 or more, the $R^3$ is independently hydrogen, or an aliphatic or hydroxy-substituted aliphatic group of up to 30 carbon atoms.

Such N-alkylated alkylenepolyamines can be prepared from polyamines such as ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2-aminoethyl)amine, propylenediamine, trimethylenediamine, tripropylenetetramine, tetraethylenepentamine, hexaethyleneheptamine, pentaethylene-hexamine, etc.

Higher homologs obtained by condensing two or more of the above-noted alkylene amines are similarly useful as are mixtures of two or more of the aforedescribed polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the aforedescribed piperazines. Ethylenepolyamine mixtures are useful.

Other useful types of polyamines mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine, triethylenetriamine and the like.

Useful substrates for this invention may be made from the above-described polyamines by acylating with acylating agents such as long chain mono carboxylic acids or esters wherein the chain length is typically from about 12 carbon atoms up to about 10 carbon atoms. Additionally, the acylating agent may be a hydrocarbyl succinic acid or anhydride or ester acylating agent. Within the hydrocarbyl succinic acid or anhydride, two chain lengths are envisioned for the hydrocarbyl groups, one is a chain length of from 12 to 50 carbon atoms and the other is a chain length of from 70 to 300 carbon atoms.

In an especially preferred embodiment, the metal overbased amine is represented by the structure $R^1R^2(B^1)(MA)_x$ wherein $B^1$ is —NH, $R^2$ is hydrogen or $(CH_2)_3NH_2$, $R^1$ is an aliphatic group containing from 10 to about 50 carbon atoms and preferably from 12 to 26 carbon atoms or $R^4NH(CH_2)_3$ wherein $R^4$ is an aliphatic group containing from 10 to about 50 carbon atoms and preferably from 12 to 26 carbon atoms, M is a metal, A is carbonate, sulfite, sulfate, thiosulfate, phosphite or phosphate and x has a value of from 1.1 to 40. The metal overbased amine is prepared from an amine of the structure $R^1R^2B^1$ wherein $R^1$, $R^2$ and $B^1$ are as defined above.

These especially preferred amines for this embodiment for overbasing include aliphatic monoamines, aliphatic diamines and aliphatic triamines. Based upon the parameters of the amine substituents, three different types of amines can be generated even though it would appear that four different amines could be generated.

When $R^2$ is hydrogen and $R^1$ is an aliphatic group, the amine structure is $C_{10-50}$ aliphatic —$NH_2$ which defines fatty primary amines. A non-exhaustive, but exemplary list of fatty amines are decylamine, undecylamine, dodecylamine, tridecylamine, tetradecylamine, pentadecylamine, hexadecylamine, heptadecylamine, octadecylamine, oleylamine, etc.

For the second amine, when $R^2$ is $(CH_2)_3 NH_2$ and $R^1$ is an aliphatic group, the amine structure is $C_{10-50}$ aliphatic $NH(CH_2)_3NH_2$.

This structure is N-aliphatic trimethylenediamine and is available from AKZO as Duomeen™ O, Duomeen™ T and Duomeen™ C.

When $R^2$ is hydrogen and $R^1$ is $R^4NH(CH_2)_3$, a different selection from the previous amines, the structure of the amine is $C_{10-50}$ aliphatic $NH(CH_2)_3NH_2$ which is still N-aliphatic trimethylenediamine. The need for different values or parameters to generate the same amine will be appreciated later in this disclosure.

For the third amine, when $R^2$ is $(CH_2)_3NH_2$ and $R^1$ is $R^4NH(CH_2)_3$, the amine structure is $C_{10-50}$ aliphatic $NH(CH_2)_3NH(CH_2)_3NH_2$.

This structure is N-aliphatic dipropylenetriamine and is available from AKZO as Trimeen™ T.

The amount of amine in the final metal overbased amine component (A) including the reaction medium (described below), is typically 10 to 40 percent by weight, preferably 15 to 30 percent, and more preferably 20 to 30 percent.

The amine described above is, or becomes, through the present invention, a substrate of an overbased material. Conventional overbased materials are well known in the lubricating arts, and are generally single phase, homogeneous Newtonian systems characterized by a metal content in excess of that which would be present according to the stoichiometry of the metal and the particular acidic organic compound reacted with the metal. The metal overbased amine (A) differs from those of the prior art in that, in place of the acidic organic compound there is employed a non-acidic, non-reactive compound containing nitrogen atom(s), as described in detail above.

The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5. For an overbased amine, of course, this acidic material is not employed. However, a metal ratio can be defined, by analogy, to be the ratio of the total equivalents of the metal to the moles of nitrogen, oxygen, and sulfur atoms in the organic compound. The overbased (B1) of the present invention typically contain 1.1 to 40 equivalents of metal per mole of amine (metal ratio) and preferably 5 to 25 equivalents of metal per mole of amine. In the metal overbased amine formula of $R^1R^2NH(MA)_x$, x represents the metal ratio.

The basicity of the overbased (B1) generally is expressed in terms of a total base number. A total base number is the amount of acid (perchloric or hydrochloric) needed to neutralize all of the overbased material's basicity. The amount of acid is expressed as potassium hydroxide equivalents. Total base number is determined by titration of one gram of overbased material with 0.1 normal hydrochloric acid solution using bromophenol blue as an indicator. The overbased (B1) of the present invention generally has a total base number of at least 20, preferably 100, more preferably 200. The overbased (B1) generally has a total base number up to 600, preferably up to 500, more preferably up to 400. The equivalents of overbased (B1) is determined by the following equation: equivalent weight=(56,100/total base number). For instance, an overbased (B1) with a total base number of 200 has an equivalent weight of 280.5 (eq. wt.=56100/200). The equivalent weight of amines is determined by dividing the molecular weight of the amine by the number of nitrogen atoms in the amine.

The overbased materials of the present invention are prepared by reacting an acidic material (typically an inorganic acid or lower carboxylic acid such as acetic acid; preferably carbon dioxide) with a mixture comprising the amine described in detail above, a reaction medium, a stoichiometric excess of a metal base M, and a promoter.

The metal compounds M useful in making the basic metal salts are generally any Group 1a or 1b metal compounds (CAS version of the Periodic Table of the Elements), as well as molybdenum and tungsten. The Group 1a metals of the metal compound include alkali metals (lithium, sodium, potassium, etc.). The Group 2a metals of the metal base include the alkaline earth metals (such as barium and, preferably, magnesium and calcium). Generally the metal compounds are delivered as metal salts. The anionic portion of the salt is hydroxyl, oxide, carbonate, borate, nitrate, other such anions or mixtures thereof.

An acidic material is used to accomplish the formation of the basic metal salt (MA). The acidic material reacts with the metal base to form (MA). The acidic material may be a liquid such as acetic, nitric, phosphoric, or sulfuric acids. Inorganic acidic materials in a solid or gaseous phase may also be used, such as HCl, $SO_2$, $SO_3$, $CO_2$, $H_2S$, or $P_2O_5$. Some of the preceding materials are not technically acids, but anhydrides which become acids in the presence of a protic material such as water. Preferred acidic materials are carbon dioxide, sulfur dioxide, sulfur trioxide, phosphorus pentoxide or mixtures thereof. Most preferably, the acidic material is a gas such as carbon dioxide. The acidic material can be envisioned as AH and the metal base as MOH

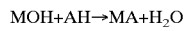

$$MOH + AH \rightarrow MA + H_2O$$

Typically about 1 equivalent of acidic material is employed per equivalent of the metal base.

Several representative examples of the formation of the x equivalents of the basic metal salt $(MA)_x$ from x equivalents of the metal base MOH and x equivalents of the acidic material AH are as follows. It is understood that before $CO_2$ and $SO_2$ act as an acidic material that $CO_2$ and $SO_2$ react with water present in the reaction vessel to form $H_2CO_3$ and $H_2SO_3$, respectively. It is also understood that calcium oxide is reacted with water present in the reaction vessel to form calcium hydroxide.

| 1 equivalent | 1 equivalent | 1 equivalent |
|---|---|---|
| MOH | +AH | → (MA) |
| NaOH | +½$H_2CO_3$ | → ½$Na_2CO_3$ |
| LiOH | +½$H_2SO_3$ | → ½$Li_2SO_3$ |
| ½Ca(OH)$_2$ | +½$H_2CO_3$ | → $CaCO_3$ |
| ½CaO | +½$H_2CO_3$ | → $CaCO_3$ |
| NaOH | +⅓$H_3PO_4$ | → ⅓$Na_3PO_4$ |
| ½Ca(OH)$_2$ | +⅓$H_3PO_4$ | → ⅙$Ca_3(PO_4)_2$ |

When one equivalent of an amine $R^1R^2NH$ is present in the reaction of x equivalents of MOH with x equivalents of AH, the reaction is

$$R^1R^2NH + xMOH + xAH \rightarrow R^1R^2NH\,(MA)_x$$

Mixtures of acidic materials can also be used. This gives rise to an A within $R^1R^2NH(MA)_x$ of a carbonate, sulfite, sulfate, thiosulfate, phosphite and phosphate as well as mixtures thereof. Preferably A is carbonate.

A promoter is a chemical employed to facilitate the incorporation of metal into the basic metal compositions. The promoters are quite diverse and are well known in the art, as evidenced by the cited patents. A particularly comprehensive discussion of suitable promoters is found in U.S. Pat. Nos. 2,777,874, 2,695,910, and 2,616,904. These include the alcoholic and phenolic promoters, which are preferred. The alcoholic promoters include the alkanols of one to twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

The reaction medium in which the above overbasing reaction is conducted comprises at least one inert, organic solvent (mineral oil, naphtha, toluene, xylene, etc.) for the amine. Preferably the medium is an oil such a mineral oil; alternatively it can be a volatile organic solvent. The use of a volatile organic solvent can be desirable when it is intended to strip off the solvent to replace it with an alternative solvent or even to isolate the remaining solids. The amount of the reaction medium should be an amount suitable to provide ready solution or dispersion of the other components during the process of preparing the overbased material. Typically the reaction medium will comprise 15 to 60 percent by weight of the total composition, preferably 25 to 50 percent, and more preferably 30 to 40 percent.

The reaction medium, however, should be a material which does not form a soluble salt of the metal base described above. The function of providing a measure of solubility to the metal base, so that it can participate in the overbasing reaction, is accomplished by the use of a catalytic amount of an organic material which is capable of forming a salt with the metal base. The salt formed thereby should be soluble in the reaction medium. This organic material can be an acidic material such as a carboxylic acid, sulfonic acid, phosphorous acid, preferably an alkyl substituted succinic acid or anhydride, or an alkylphenol. The amount of this organic material (the acidic material, for example) is described as a "catalytic amount," by which is meant a relatively small amount sufficient to permit incorporation of the metal into the composition in association with the amine. The amount will not be so large that the acidic material itself begins to serve as the primary or a significant substrate for the overbasing process. These suitable amounts are typically 0.01 to 5 percent by weight of the total composition, and preferably 0.5 to 2 percent. Expressed in another fashion, the amount of the acidic organic material is typically 0.05 to 25 percent by weight of the amine containing the oxygen, nitrogen, or sulfur, which is being overbased. Preferably the amount of the acidic organic material up to 15 percent by weight, preferably up to 9 percent, and more preferably up to 6 percent, e.g., 2–6 percent by weight of the amine.

Patents specifically describing techniques for making basic salts of acids include U.S. Pat. Nos. 2,501,731; 2,616,905; 2,616,911: 2,616,925, 2,777,874; 3,256,186; 3,384,585; 3,365,396; 3,320,162; 3,318,809; 3,488,284; and 3,629,109. Reference may be made to these patents for their disclosures in this regard as well as for their disclosure of specific suitable basic metal salts. The teachings, of course, must be modified as appropriate for the use of the amines of the present invention in place of the acids described in the references.

Briefly, the basic salts of the amines of the present invention are prepared by preparing a mixture of the amine, the reaction medium, the metal base, and the salt-forming organic material, and adding thereto the appropriate amount of the low molecular weight acidic material, that is, one preferably containing no more than 6 carbon atoms. Liquid or solid acidic materials can be added to a stirred mixture by conventional means; gaseous acidic materials can be added by passing the gas (bubbling the gas) into a stirred reaction mixture. The temperature of the addition of gas is not critical; temperatures in the range of 100 to 150° C. have been found to be quite suitable. The reaction can be done in a single step or incrementally.

Once an overbased amine is obtained it can be further treated or reacted, as desired. Carbonate overbased amines $R^1R^2(B^1)(MA)_x$ wherein A is carbonate (i.e., those prepared by reaction with carbon dioxide) can be reacted with a source of sulfur dioxide to provide a sulfite overbased material wherein A is sulfite. During the course of the reaction, some or all of the carbon dioxide will be displaced by the sulfur dioxide. In another modification, sulfite overbased material (prepared either by direct addition of $SO_2$ or by $SO_2$ displacement of $CO_2$) can be further reacted with a source of sulfur to provide a thiosulfate overbased material wherein A is thiosulfate. Suitable sources of sulfur include elemental sulfur, sulfur halides, combinations of sulfur or sulfur oxides with hydrogen sulfide, phosphorus sulfides, and various sulfurized organic compounds. Sulfur halides include sulfur monochloride and sulfur dichloride. Phosphorus sulfides include phosphorus pentasulfide, $P_4S_7$, $P_4S_3$, and $P_2S_3$. Sulfurized organic compounds include 2,2'-dithiodiisobutyraldehyde, dibenzyl sulfide, dixylyl sulfide, dicetyl sulfide, diparaffin wax sulfide and polysulfide, and cracked wax oleum sulfides sulfurized oils, and sulfurized fatty acids. Additional sulfur sources, and methods of their preparation, can be found by referring to European Publication 0 586 258. The conversion of carbonate overbased salts of conventional acid substrates into sulfite overbased materials has been disclosed in detail in U.S. Pat. No. 5,250,204. Further details on the conversion of sulfite overbased salts of conventional acid substrates into thiosulfate overbased materials can be obtained by referring to European Publication 0 586 258.

As used herein, the term "hydrocarbyl substituent" or "hydrocarbyl group" is used in its ordinary sense, which is well known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The term "hydrocarbyl" is also intended to include hydrocarbylene, that is, groups having non-hydrocarbon functionality at multiple ends.

As stated earlier, based upon the parameters of the amine substituents of the especially preferred amine, three different types of amines can be generated even though it would appear that four different amines could be generated. Further, a selection of different values generates the same two amines—the N—aliphatic trimethylenediamines. However, by the factoring in of the $(MA)_x$ moiety—that is, for diamines, which nitrogen atom is associated with or aligns with the $(MA)_x$ moiety—one readily can determine that five different overbased amines can be generated.

For example, in the structure $R^1R^2(B^1)MA)_x$, when $R^2$ is hydrogen and $R^1$ is an aliphatic group, the overbased amine structure is $C_{10\text{-}50}$ aliphatic —$NH_2(MA)_x$.

This is an overbased primary fatty amine wherein the overbased moiety $(MA)_x$ is aligned with the primary amine, the only amine present.

In the structure $R^1R^2(B^1)(MA)_x$, when $R^2$ is $(CH_2)_3NH_2$ and $R^1$ is an aliphatic group, the overbased amine structure is

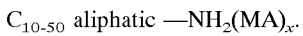

wherein the overbased moiety $(MA)_x$ is aligned with the secondary amine.

In the structure $R^1R^2(B^1)(MA)_x$ when $R^2$ is hydrogen and $R^1$ is $R^4NH(CH_2)_3$ wherein $R^4$ is an aliphatic group, the overbased amine structure is

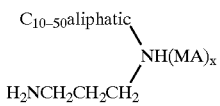

wherein the overbased moiety $(MA)_x$ is aligned with the primary amine.

In the structure, $R^1R^2(B^1)(MA)_x$ when $R^2$ is $(CH_2)_3NH_2$ and $R^1$ is $R^4NH(CH_2)_3NH_2$, wherein $R^4$ is an aliphatic group. The overbased amine structure is

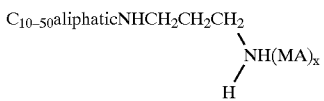

wherein the overbased moiety $(MA)_x$ is aligned with the secondary amine.

Finally, when at least two nitrogen atoms are present in the amine, the metal may be aligned with any two of the nitrogen atoms, as in chelation.

Preparation of the Metal Overbased Amine (B1)

EXAMPLE (B1)-1

To a 2 L flask is charged 175 parts tallowdiaminopropane, 150 parts mineral oil, 30 parts polyisobutylene-substituted succinic anhydride and 27 parts propylene tetramer-substituted phenol. The mixture is heated to 50–60° C. and 42 parts lithium hydroxide monohydrate is added, with stirring. Carbon dioxide is blown into the mixture at 28 L/hr (1.0 std. ft$^3$/hr) for 2 hours at 120–130° C. (the exothermic reaction increases the temperature to 170–180° C). Infrared analysis shows the formation of $Li_2CO_3$. A second charge of 42 parts lithium hydroxide monohydrate is added and the mixture carbonated as above, followed by addition of a third charge of 42 parts lithium hydroxide and carbonation. To the resulting viscous oil is added hexane diluent, the mixture centrifuged and filtered through filter aid, then vacuum stripped to yield 350 parts light brown oil.

EXAMPLE (B1)-2

To a 1 L flask is charged 175 parts tallowdiaminopropane, 150 parts mineral oil, 20 parts of calcium salt of methylene-coupled heptyl phenol, 20 parts polyisobutylene-substituted succinic anhydride, 50 parts mixed isobutyl and amyl alcohols (1:1), and 12 parts methanol. In this mixture is dissolved, with stirring, 2 parts calcium chloride and 8 parts water; to this mixture is added, with stirring, 37 parts calcium hydroxide. The mixture is heated to 50° C. and carbon dioxide is blown into the reaction mixture at 28 L/hr (1.0 std. ft$^3$/hr) for 2 hours, maintaining the temperature at about 50–60° C. After 2 hours, infrared analysis indicates formation of calcium carbonate. An additional 18 parts of calcium hydroxide is added and carbonation is continued for an additional 2.5 hours. The mixture is then purged with nitrogen at 150° C. and the solvent is removed by distillation followed by vacuum stripping for 0.5 hours. The mixture is filtered using a filter aid, to yield 360 parts of a green oil product.

EXAMPLE (B1)-3

To a 2 L flask is charged 50 parts tallowdiaminopropane, 209 parts of a calcium salt of a methylene-coupled heptyl phenol and 92 parts isooctyl alcohol. The contents are stirred and heated to 45° C. and held for 0.25 hours. Added is 70 parts methyl alcohol, 1 part calcium chloride and 46 parts calcium oxide. The contents are blown below the surface at 0.5 cubic feet per hour for one hour. The contents are then stripped to 120° C. with nitrogen blowing below the surface and then vacuum stripped to 20 millimeters of mercury. The contents are filtered using a filtering aid. Analyses % calcium sulfate ash is 23.5 and total base number to bromophenol blue is 238. In the formula $R^1R^2NH(MA)_x$, M is calcium, A is carbonate and x is 3.

EXAMPLE (B1)-4

A 12 L flask is charged with 700 parts (2.0 mole) N-oleyl-1,3-diaminopropane, 150 parts (0.22 mole) polyisobutylene substituted succinic anhydride, 150 parts (0.54 mole) propylene tetramer-substituted phenol and 800 parts mineral oil. The mixture is heated to 50° C. and 280 parts of sodium hydroxide is added. The temperature is increased to 135–140° C. and into this mixture is blown carbon dioxide at 1.75 cubic feet per hour for 5 to 6 hours. Water is collected in a Dean Stark trap where 26 parts is obtained. The contents are cooled to 100° C. and the second increment of sodium hydroxide—320 parts is added and the contents are carbonated as per above. A third increment—320 parts and a fourth increment 280 parts are added and both of these increments are carbonated as above. A total of 215 parts is obtained in the Dean Stark trap. The contents are stripped to 150° C. and 20 millimeters mercury for 0.5 hours until no additional water is obtained. The contents are filtered through filter aid at 120–130° C. to give 2675 parts of a light brown product. Analyses: % sodium is 22; % ash is 49; % nitrogen is 1.58. In the formula $R^1R^2NH(MA)_x$, M is sodium, A is carbonate and x is 15.

EXAMPLE (B1)-5

Example (B1)-4 is essentially repeated but at a lower conversion. In the formula $R^1R^2NH(MA)_x$, M is sodium, A is carbonate and x is 5.

EXAMPLE (B1)-6

To a 2 liter flask is charged 1029 parts (7.0 equivalents) of the product of Example (B1)-4. The contents are heated to 140° C. and $SO_2$ is blown below the surface at 0.5 cubic feet per hour for 5 hours, until the disappearance of the sodium carbonate band on the IR at 880 cm$^{-1}$ is observed. Nitrogen is then blown below the surface for 1 hour. The contents are filtered to give a product that has a % sodium of 9.6, and % sulfur of 8.0. In the formula $R^1R^2NH(MA)_x$, M is sodium, A is sulfite and x is 5.0.

EXAMPLE (B1)-7

To a 1 liter flask is charged 400 parts (1.0 equivalent) of the product of Example (B1)-6. Added is 26 parts (0.8 equivalents) of sulfur over 20 minutes. A thick thiosulfate oil is formed. Added is 200 ml toluene and the contents are heated to reflux and held for 1 hour. The contents are filtered to give a product having a % sodium of 8.9 and % sulfur of 12.9. In the formula $R^1R^2NH(MA)_x$, M is sodium, A is thiosulfate and x is 5.0.

EXAMPLE (B1)-8

To a 2 liter flask is charged 1700 parts (15.7 equivalents) of the product of Example (B1)-4 and 340 parts diluent oil. The contents are heated to 100° C. and $SO_2$ is blown below the surface at 1.5 cubic feet per hour at 100–120° C. for 10 hours until the disappearance of the sodium carbonate on the IR at 880 cm$^{-1}$ is observed. The contents are then purged with nitrogen below the surface at 1 cubic foot per hour for 1 hour. The contents are filtered to give a product having a % sodium of 14.3 and % sulfur of 11.8 and x of 15.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. As used herein, the expression "consisting essentially of" permits the inclusion of substances which do not materially affect the basic and novel characteristics of the composition under consideration.

The metal overbased carboxylic acid, component (B2) is represented by the structure $R^{17}(B^2)COOM(MA)_y$ wherein $R^{17}$ is an aliphatic group containing from 10 to 50 carbon atoms, $B^2$ is the reactive basic functionality comprising —OH, M is a metal, A is carbonate, sulfite, sulfate, thiosulfate, phosphite or phosphate and y is an integer of from 1.1 to 10. The metal overbased hydroxy substituted carboxylic acid (B2) is prepared by overbasing a carboxylic acid that contains a hydroxy substituent.

In the carboxylic acid, $R^{17}$ is an aliphatic group and $R^{17}(B^2)$ is a hydroxy substituted aliphatic group that contains up to 23 carbon atoms, preferably up to 21 carbon atoms, and most preferably from 11 to 17 carbon atoms. The aliphatic group may be alkyl or alkenyl. The carboxylic acid is a mono-hydroxy substituted mono-carboxylic acid. The preferred mono-hydroxy substituted mono-carboxylic acids are 10-hydroxydodecanoic acid, 12-hydroxydodecanoic acid, 3-hydroxytetradecanoic acid, 16-hydroxypalmitic acid, 6-hydroxystearic acid, 12-hydroxystearic acid, 14-hydroxystearic acid, 16-hydroxystearic acid, ricinoleic acid and 14-hydroxy-11-eicosenoic acid. A most preferred mono-hydroxy substituted mono-carboxylic acid is 12-hydroxystearic acid.

But for the carbonation temperature, the overbasing procedure of either the first or second carboxylic acid is similar to the overbasing of the amine as described above. For overbased amines, the carbonation temperature is in the range of 100–150° C. For carboxylic acid overbasing, the carbonation temperature is in the range of 40–150° C. The carboxylic acid overbasing also involves an excess metal, an acidic material, a promoter and a reaction medium. For the carboxylic acid, the metals used are sodium or calcium and the preferred metal for overbasing is calcium, either in the form of calcium hydroxide or calcium oxide.

Preparation of the Metal Overbased Hydroxy Substituted Carboxylic Acid (B2)

EXAMPLE (B2)-1

Added to a 5 liter flask are 300 parts (1 equivalent) of 12-hydroxy stearic acid and 1500 parts xylene. The contents are heated and stirred to 50° C. and added is 2 parts calcium chloride dissolved in 10 parts water and 44 parts (1.2 equivalents) of calcium hydroxide. The temperature is raised to 95–100° C. and held for 2.5 hours. The temperature is lowered to 65° C. and 120 parts methyl alcohol is added followed by 50 parts (1.8 equivalents) of calcium oxide. The contents are carbonated with carbon dioxide gas below the surface at 0.55 cubic feet per hour until a direct base number to phenolphthalein is 10. This procedure is repeated with a second increment of 50 parts calcium oxide followed by carbonation to a 10 direct base number. A third increment of 56 parts calcium oxide is added and now the contents are carbonated to a zero direct base number. The contents are stripped to 120° C. under vacuum and then filtered using a filter aid. The % $CaSO_4$ ash is 29.3 and the total base number is 243.

The metal overbased dispersant, component (B3) is represented by the structure $R^{18}(B^3)(MA)_z$ wherein $R^{18}$ is a hydrocarbyl group of the structure

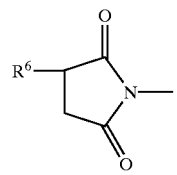

wherein $R^6$ is a hydrocarbyl group that contains from 40 to about 500 carbon atoms, $B^3$ is the reactive basic functionality comprising

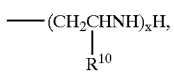

—(CH$_2$CHNH)$_x$H,
|
R$^{10}$ wherein x is an integer of from 1 to 8 and R$^{10}$ is hydrogen or an alkyl group containing 1 to 2 carbon atoms, M is a metal, A is carbonate, sulfite, sulfate, thiosulfate, phosphite or phosphate and z is an integer of from 1.1 to 30. The dispersant is a succinimide dispersant prepared by reacting a carboxylic acylating agent and a nitrogen containing compound.

The starting material for succinimide dispersants is a hydrocarbyl substituted succinic acylating agent. Two different succinimide dispersants are envisioned in this invention. The succinimide dispersants are the reaction product of a hydrocarbyl substituted succinic acylating agent and an amine. The succinimide dispersants formed depend upon the type of the hydrocarbyl substituted succinic acylating employed. Two types of hydrocarbyl substituted succinic acylating agents are envisioned as Type I and Type II. The Type I succinic acylating agent is of the formula

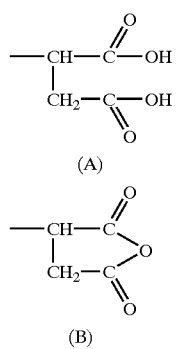

(X)

(A)

(B)

In the above formula, R$^6$ is a hydrocarbyl based substituent having from 40 to 500 carbon atoms and preferably from 50 to 300 carbon atoms. The Type I hydrocarbyl-substituted succinic acylating agents are prepared by reacting one mole of an olefin polymer or chlorinated analog thereof with one mole of an unsaturated carboxylic acid or derivative thereof such as fumaric acid, maleic acid or maleic anhydride.

The Type II hydrocarbyl substituted succinic acylating agent, hereinafter Type II succinic acylating agent, is characterized as a polysuccinated hydrocarbyl substituted succinic acylating agent such that more than one mole of an unsaturated carboxylic acid or derivative is reacted with one mole of an olefin polymer or chlorinated analog thereof.

The olefin monomers from which the olefin polymers are derived that ultimately become R$^6$ are from 40 to 500 carbon atoms and preferably from 50 to about 300 carbon atoms.

As noted above, the hydrocarbon-based substituent R$^6$ present in the Type I acylating agent is derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1, or polyolefinic monomers (usually di-olefinic monomers such as butadiene-1,3 and isoprene). Usually these monomers are terminal olefins, that is, olefins characterized by the presence of the group

>C=CH$_2$

However, certain internal olefins can also serve as monomers (these are sometimes referred to as medial olefins).

When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally, the olefin polymers are homo- or interpolymers of terminal hydrocarbyl olefins of about 2 to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2 butadiene-1,3 pentadiene-1,2 pentadiene-1,3, isoprene, hexadiene-1,5,2-chloro-butadiene-1,3,2-methylheptene-1,3-cyclohexylbutene-1,3,3-dimethyl-pentene-1, styrenedivinylbenzene, vinylacetate, allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s. These polyisobutenyl polymers may be obtained by polymerization of a C$_4$ refinery stream having a butene content of about 35 to about 75 percent by weight and an isobutene content of about 30 to about 60 percent by weight in the presence of a Lewis acid catalyst such as aluminum chloride or boron trifluoride. These poly(isobutene)s contain predominantly (that is, greater than 80% of the total repeat units) isobutene repeat units of the configuration

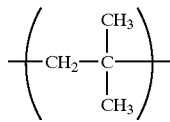

The hydrocarbyl-substituted succinic acylating agent is represented by R$^7$ and contains a hydrocarbyl, alkyl or alkenyl group of about 40, often about 50, to about 500, sometimes about 300, carbon atoms. U.S. Pat. No. 4,234,435 is expressly incorporated herein by reference for its disclosure of procedures for the preparation of polysuccinated hydrocarbyl-substituted succinic acylating agents and dispersants prepared therefrom.

The Type II succinic acid acylating agents can be made by the reaction of maleic anhydride, maleic acid, or fumaric acid with the afore-described olefin polymer, as is shown in the patents referred to above. Generally, the reaction involves merely heating the two reactants at a temperature of about 150° C. to about 200° C. Mixtures of these polymeric olefins, as well as mixtures of these unsaturated mono- and polycarboxylic acids can also be used.

In another embodiment, the Type II acylating agent consists of substituent groups and succinic groups wherein the substituent groups are derived from polyalkenes characterized by an Mn value of at least about 1200 and an Mw/Mn ratio of at least about 1.5, and wherein said acylating agents are characterized by the presence within their structure of an average of at least about 1.3 succinic groups for each equivalent weight of substituent groups.

The Type II substituted succinic acylating agent can be characterized by the presence within its structure of two groups or moieties. The first group or moiety is referred to hereinafter, for convenience, as the "substituent group(s)" $R^8$ and is derived from a polyalkene. The polyalkene from which the substituted groups are derived is characterized by an Mn (number average molecular weight) value of at least 1200 and more generally from about 1500 to about 5000, and an Mw/Mn value of at least about 1.5 and more generally from about 1.5 to about 6. The abbreviation Mw represents the weight average molecular weight. The number average molecular weight and the weight average molecular weight of the polybutenes can be measured by well-known techniques of vapor phase osmometry (VPO), membrane osomometry and gel permeation chromatography (GPC). These techniques are well-known to those skilled in the art and need not be described herein.

The second group or moiety is referred to herein as the "succinic group(s)". The succinic groups are those groups characterized by the structure

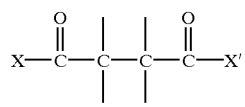

(VIII)

wherein X and X' are the same or different provided at least one of X and X' is such that the Type II substituted succinic acylating agent can function as carboxylic acylating agents. That is, at least one of X and X' must be such that the substituted acylating agent can form amides or amine salts with, and otherwise function as a conventional carboxylic acid acylating agents. Transesterification and transamidation reactions are considered, for purposed of this invention, as conventional acylating reactions.

Thus, X and/or X' is usually —OH, —O-hydrocarbyl, —O—M⁺ where M⁺ represents one equivalent of a metal, ammonium or amine cation, —NH₂, —Cl, —Br, and together, X and X' can be —O— so as to form the anhydride. The specific identity of any X or X' group which is not one of the above is not critical so long as its presence does not prevent the remaining group from entering into acylation reactions. Preferably, however, X and X' are each such that both carboxyl functions of the succinic group (i.e., both —C-(O)X and —C(O)X' can enter into acylation reactions.

One of the unsatisfied valences in the grouping

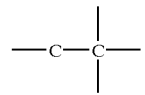

of Formula VIII forms a carbon-to-carbon bond with a carbon atom in the substituent group. While other such unsatisfied valence may be satisfied by a similar bond with the same or different substituent group, all but the said one such valence is usually satisfied by hydrogen; i.e., —H.

The Type II succinic acylating agents are characterized by the presence within their structure of 1.3 succinic groups (that is, groups corresponding to Formula VIII) for each equivalent weight of substituent groups $R^7$. For purposes of this invention, the number of equivalent weight of substituent groups $R^7$ is deemed to be the number corresponding to the quotient obtained by dividing the Mn value of the polyalkene from which the substituent is derived into the total weight of the substituent groups present in the substituted succinic acylating agents. Thus, if the Type II succinic acylating agent is characterized by a total weight of substituent group of 40,000 and the Mn value for the polyalkene from which the substituent groups are derived is 2000, then that Type II substituted succinic acylating agent is characterized by a total of 20 (40,000/2000=20) equivalent weights of substituent groups. Therefore, that particular Type II succinic acylating agent must also be characterized by the presence within its structure of at least 26 succinic groups to meet one of the requirements of the novel succinic acylating agents of this invention.

Another requirement for the Type II succinic acylating agents is that the substituent group $R^7$ must have been derived from a polyalkene characterized by an Mw/Mn value of at least about 1.5.

Polyalkenes having the Mn and Mw values discussed above are known in the art and can be prepared according to conventional procedures. Several such polyalkenes, especially polybutenes, are commercially available.

In one preferred embodiment, the succinic groups will normally correspond to the formula

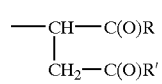

(IX)

wherein R and R' are each independently selected from the group consisting of —OH, —Cl, —O-lower alkyl, and when taken together, R and R' are —O—. In the latter case, the succinic group is a succinic anhydride group. All the succinic groups in a particular Type II succinic acylating agent need not be the same, but they can be the same. Preferably, the succinic groups will correspond to

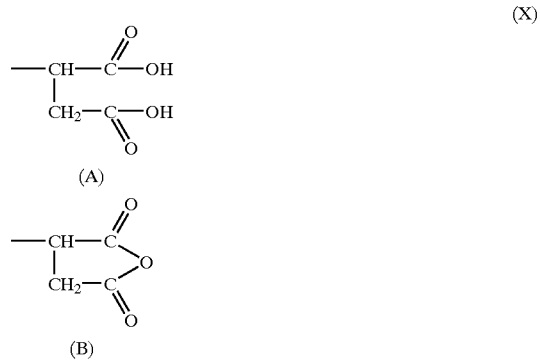

and mixtures of (X(A)) and (X(B)). Providing Type II succinic acylating agents wherein the succinic groups are the same or different is within the ordinary skill of the art and can be accomplished through conventional procedures such as treating the substituted succinic acylating agents themselves (for example, hydrolyzing the anhydride to the free acid or converting the free acid to an acid chloride with thionyl chloride) and/or selecting the appropriate maleic or fumaric reactants.

As previously mentioned, the minimum number of succinic groups for each equivalent weight of substituent group is 1.3. The maximum number generally will not exceed 6. Preferably the minimum will be 1.4; usually 1.4 to about 6 succinic groups for each equivalent weight of substituent group. A range based on this minimum is at least 1.5 to about 3.5, and more generally about 1.5 to about 2.5 succinic groups per equivalent weight of substituent groups.

From the foregoing, it is clear that the Type II succinic acylating agents can be represented by the symbol $R^7(R^9)_y$ wherein $R^7$ represents one equivalent weight of substituent group, $R^9$ represents one succinic group corresponding to Formula (VI), Formula (IX), or Formula (X), as discussed above, and y is a number equal to or greater than 1.3. The more preferred embodiments of the invention could be similarly represented by, for example, letting $R^7$ and $R^9$ represent more preferred substituent groups and succinic groups, respectively, as discussed elsewhere herein and by letting the value of y vary as discussed above.

In addition to preferred substituted succinic groups where the preference depends on the number and identity of succinic groups for each equivalent weight of substituent groups, still further preferences are based on the identity and characterization of the polyalkenes from which the substituent groups are derived.

With respect to the value of Mn for example, a minimum of about 800 and a maximum of about 5000 are preferred with an Mn value in the range of from about 1300 or 1500 to about 5000 also being preferred. A more preferred Mn value is one in the range of from about 1500 to about 2800. A most preferred range of Mn values is from about 1500 to about 2400. With polybutenes, an especially preferred minimum value for Mn is about 1700 and an especially preferred range of Mn values is from about 1700 to about 2400.

As to the values of the ratio Mw/Mn, there are also several preferred values. A minimum Mw/Mn value of about 1.8 is preferred with a range of values of about 1.8 up to about 5.0 also being preferred. A still more preferred minimum value of Mw/Mn is about 2.0 to about 4.5 also being a preferred range. An especially preferred minimum value of Mw/Mn is about 2.5 with a range of values of about 2.5 to about 4.0 also being especially preferred.

Before proceeding to a further discussion of the polyalkenes from which the substituent groups are derived, it should be pointed out that these preferred characteristics of the Type II succinic acylating agents are intended to be understood as being both independent and dependent. They are intended to be independent in the sense that, for example, a preference for a minimum of 1.4 or 1.5 succinic groups per equivalent weight of substituent groups is not tied to a more preferred value of Mn or Mw/Mn. They are intended to be dependent in the sense that, for example, when a preference for a minimum of 1.4 to 1.5 succinic groups is combined with more preferred values of Mn and/or Mw/Mn, the combination of preferences does, in fact, describe still further more preferred embodiments of this component. Thus, the various parameters are intended to stand alone with respect to the particular parameter being discussed but can also be combined with other parameters to identify further preferences. This same concept is intended to apply throughout the specification with respect to the description of preferred values, ranges, ratios, reactants, and the like unless a contrary intent is clearly demonstrated or apparent.

The polyalkenes from which the substituent groups are derived are homopolymers and interpolymers of polymerizable olefin monomers as disclosed within $R^6$ above.

In preparing the Type II succinic acylating agent, one or more of the above-described polyalkenes is reacted with one or more acidic reactants selected from the group consisting of maleic or fumaric reactants of the general formula

wherein X and X' are as defined hereinbefore. Preferably the maleic and fumaric reactants will be one or more compounds corresponding to the formula

wherein R and R' are as previously defined herein. Ordinarily, the maleic or fumaric reactants will be maleic acid, fumaric acid, maleic anhydride, or a mixture of two or more of these. The maleic reactants are usually preferred over the fumaric reactants because the former are more readily available and are, in general, more readily reacted with the polyalkenes (or derivatives thereof) to prepare the Type II substituted succinic acylating agent. The especially preferred reactants are maleic acid, maleic anhydride, and mixture of these. Due to availability and ease of reaction, maleic anhydride will usually be employed.

The one or more polyalkenes and one or more maleic or fumaric reactants can be reacted according to any of several known procedures in order to produce the Type I or Type II acylating agents of the present invention. In preparing the succinimide dispersant, the hydrocarbyl substituted succinic acylating agent is reacted with (a) ammonia, or (b) an amine.

The substituted succinic anhydride, as Type I or Type II, ordinarily is reacted directly with an ethylene amine or a condensed polyamine although in some circumstances it may be desirable first to convert the anhydride to the acid before reaction with the amine. In other circumstances, it may be desirable to prepare the substituted succinic acid by some other means and to use an acid prepared by such other means in the process. In any event, either the acid or the anhydride may be used in this invention.

The term "ethylene amine" is used in a generic sense to denote a class of polyamines conforming for the most part of the structure

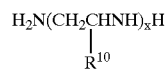

in which x is an integer of from 1 to 8 and $R^{10}$ is an alkyl group containing 1–2 carbon atoms or hydrogen. Thus it includes, for example, ethylene diamine, diethylene triamine, triethylene tetramine, tetraethylene pentamine, pentaethylene hexamine, etc. These compounds are discussed in some detail under the heading "Ethylene Amines" in "Encyclopedia of Chemical Technology," Kirk and Othmer, vol. 5, pages 898–905, Interscience Publishers, New York (1950). Such compounds are prepared most conveniently by the reaction of ethylene dichloride with ammonia. This procedure results in the production of somewhat complex mixtures of ethylene amines, including cyclic condensation products such as piperazines and these mixtures find use in this invention. On the other hand, quite satisfactory products may be obtained also by the use of pure ethylene amines. An especially useful ethylene amine, for reasons of economy as well as effectiveness as a dispersant, is a mixture of ethylene amines manufactured by Union Carbide and identified as "PAM-H", which is a mixture of 75% polyamine bottoms and 25% diethylenetriamine.

It has been noted that at least one half of a chemical equivalent amount of the ethylene amine per equivalent of substituted succinic anhydride must be used in the process to produce a satisfactory product with respect to dispersant properties and generally it is preferred to use these reactants in equivalent amounts. Amounts up to 2.0 chemical equivalents (per equivalent of substituted succinic anhydride) have been used with success, although there appears to be no advantage attendant upon the use of more than this amount. The chemical "equivalency" of the ethylene amine reactant is upon the nitrogen content, i.e., one having four nitrogens per molecule has four equivalents per mole.

In the reactions that follow, the amine is $B^3NH_2$ and it is understood that the $B^3NH_2$ is an ethylene amine of the structure

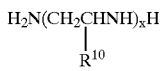

wherein $R^{10}$ and x are as previously defined.

The reaction of the process involves a splitting out of water and the reaction conditions are such that this water is removed as it is formed. Presumably, the first principal reaction that occurs, following salt formation, is the formation of a half amide

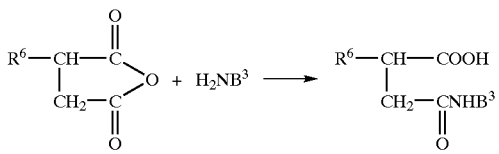

followed then by reaction of the acid and amide functionalities to form the succinimide.

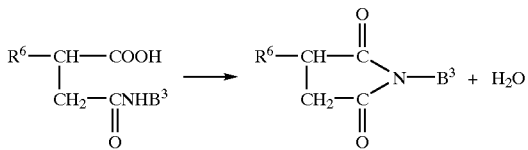

The first reaction appears to take place spontaneously (when a substituted succinic anhydride is used) upon mixing, but the second requires heating. Temperatures within the range of about 80° C. to about 200° C. are satisfactory, and within this range it is preferred to use a reaction temperature of from about 100° C. to about 160° C. A useful method of carrying out this step is to add some toluene to the reaction mixture and to remove the water by azeotropic distillation. As indicated before there is also some salt formation.

The overbasing procedure of either the Type I or Type II succinic dispersants is similar to the overbasing of the amine as described above. The dispersant overbasing also involves an excess metal, an acidic material, a promoter, and a reaction medium. For the dispersant, the preferred metal for overbasing is sodium.

A specific example for the preparation of a succinic dispersant utilizing the Type I succinic acylating agent and then overbased is as follows.

EXAMPLE (B3)-1

A polyisobutenyl succinic anhydride having an acid number of 100 and an equivalent weight of 560 was prepared by the reaction of a chlorinated polyisobutylene (having an average molecular weight of 1,050 and a chlorine content of 4.3%) and maleic anhydride. To a mixture of 1000 parts of the polyisobutenyl succinic anhydride and 662 parts of mineral oil there was added at 65–95° C. 149 parts of an ethylene amine mixture available from Union Carbide under the trade name "PAM-H". This mixture then was heated to 150° C. to distill all of the water formed in the reaction. Nitrogen was bubbled through the mixture at this temperature to insure removal of the last traces of water. The residue was diluted by 74 parts by weight of mineral oil and this oil solution is found to have a nitrogen content of 2.5%.

Added to a 3 liter 4 neck flask is 1422 parts (2.5 equivalents) of the above-obtained Type I dispersant, 20 parts of a polypropylene tetramer substituted phenol and 50 parts of the above-identified polyisobutenyl succinic anhydride. The contents are heated to 100° C. and added are 40 parts (1 equivalent) of sodium hydroxide pellets. The contents are carbonated below the surface at 1 cubic foot per hour for 45 minutes. Then three 120 part increments of sodium hydroxide are added with carbonation continuing at 1 cubic foot per hour for 1 hour, 1.5 hours and 1.5 hours respectively. Before the addition of the third increment, 275 parts of diluent oil is added. Then 100 parts of sodium hydroxide is added while carbonating for 1.5 hours. When carbonation is finished, 75 parts of diluent oil is added. The contents are vacuum stripped to 140° C. and 20 milliliters of mercury. Total water obtained is 90 pars. The contents are filtered to give a product having a % $Na_2SO_4$ ash of 31.42 and a total base number of 310.

A specific example for the preparation of succinic dispersants utilizing the Type II succinic acylating agent and then overbased is as follows.

EXAMPLE (B3)-2

A mixture of 510 parts (0.28 mole) of polyisobutene ($\overline{M}n=1845$; $\overline{M}w=5325$) and 59 parts (0.59 mole) of maleic anhydride is heated to 110° C. This mixture is heated to 190° C. in seven hours during which 43 parts (0.6 mole) of gaseous chlorine is added beneath the surface. At 190°–192° C. an additional 11 parts (0.16 mole) of chlorine is added over 3.5 hours. The reaction mixture is stripped by heating at 190°–193° C. with nitrogen blowing for 10 hours. The residue is the desired polyisobutene-substituted Type II succinic acylating agent having a saponification equivalent number of 87 as determined by ASTM procedure D-94.

A mixture is prepared by the addition of 10.2 parts (0.25 equivalent) of a commercial mixture of ethylene polyamines having about 3 to about 10 nitrogen atoms per molecule to 113 parts of mineral oil and 161 parts (0.25 equivalent) of the substituted succinic acylating agent prepared above at 138° C. The reaction mixture is heated to 150° C. in 2 hours and stripped by blowing with nitrogen. The reaction mixture is filtered to yield the filtrate as an oil solution of the desired product.

An overbased product is prepared of this Type II dispersant following the procedure of Example (B3)-1.

In order to prepare the metal containing polymer composition of a metal overbased imide or ester functionalized polymer, it becomes necessary to react (A) the polymer with (B) the metal overbased composition that contains reactive basic a functionality. In the reaction of (A) and (B), with (A) being the acidic component and (B) being the basic component, an equivalent excess of (B) is used with respect to (A) such that all the acidic functionality of (A) is totally consumed. When (A) is (A1), the polyolefin of (A1) is present in the metal-containing polymer composition at from 0.1 to about 10 weight percent and preferably at from 0.1 to about 5 weight percent. Simplified examples of the (A)+(B) reaction scheme are as shown below:

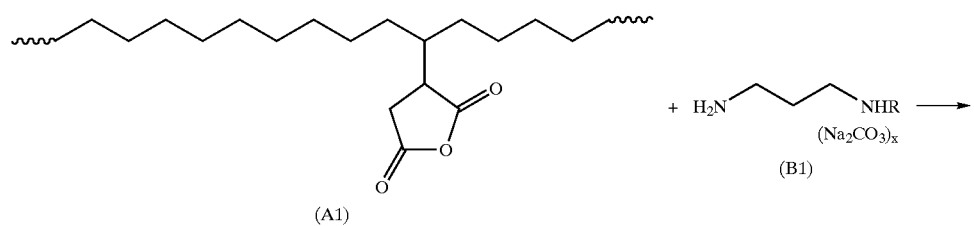
(A1) + H$_2$N⌒⌒NHR (Na$_2$CO$_3$)$_x$ ⟶
(B1)
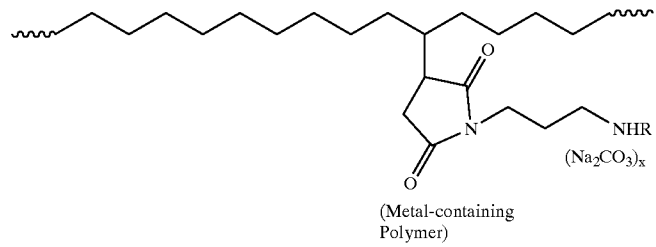
(Metal-containing Polymer)
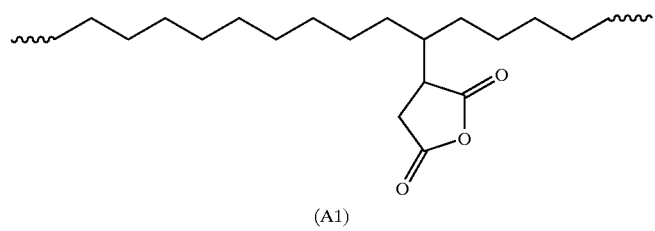
(A1) +
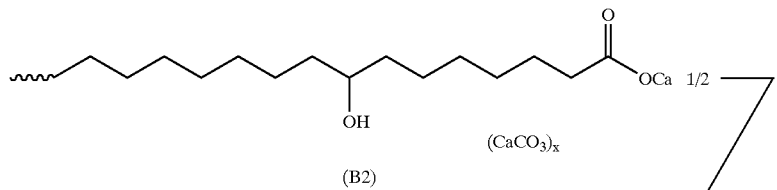
(B2)
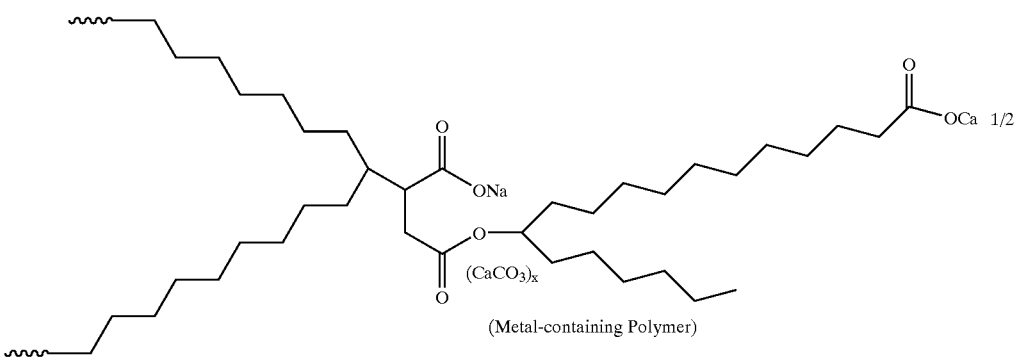
(Metal-containing Polymer)
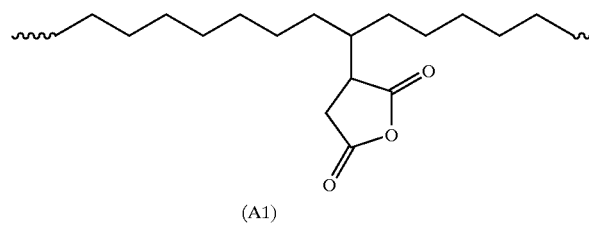
(A1)
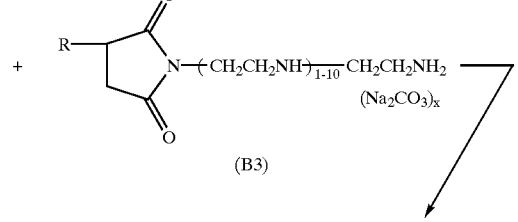
(B3)

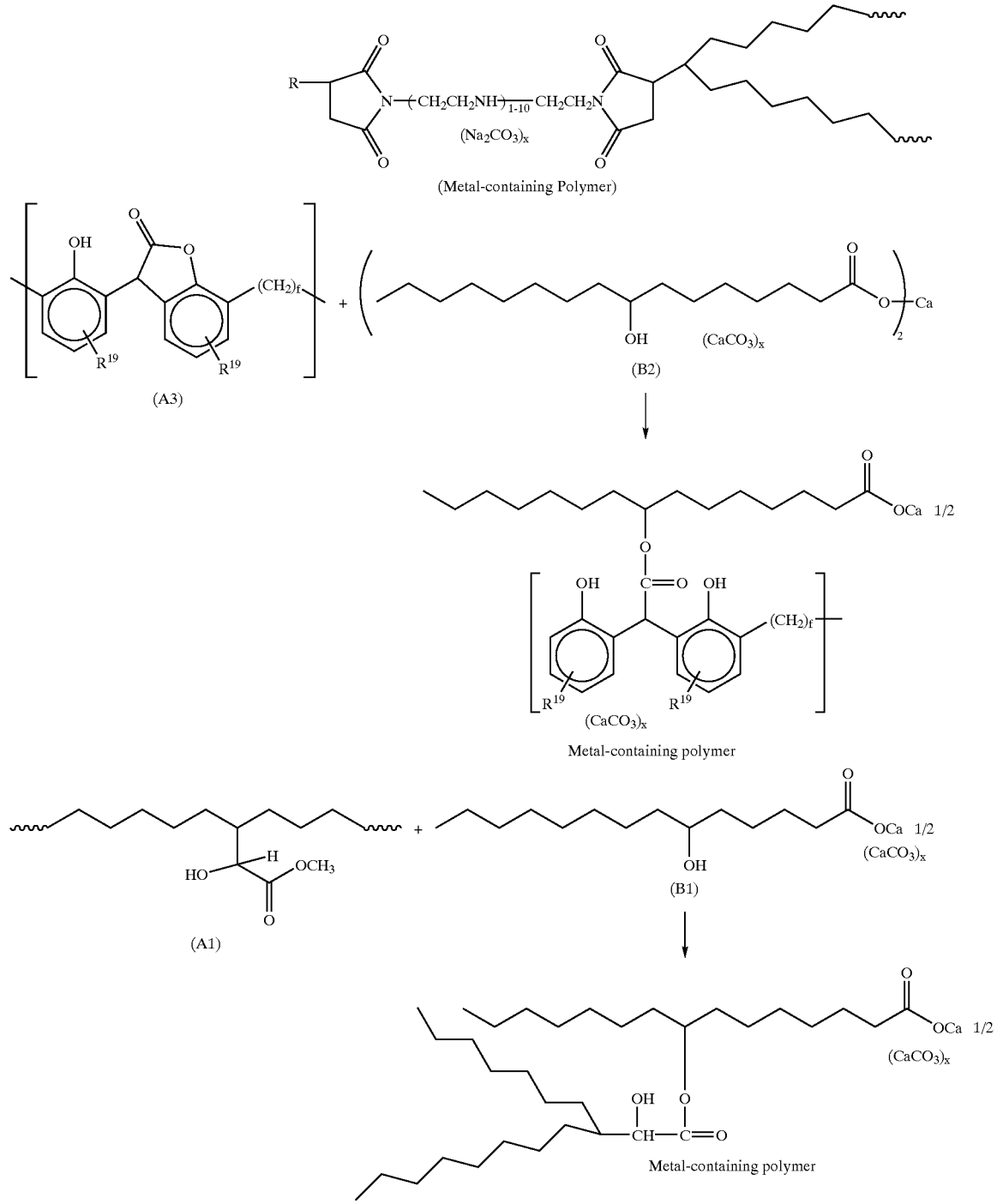

EXAMPLE 1
(A1)+(B1)

Added to a 2 liter 4-neck flask are 350 parts (0.02 equivalents) of a maleinated ethylene propylene copolymer of the product of Example (A1)-7 and 18 parts (0.01 equivalents) of sodium, overbased amine of the product of Example (B1)-4. The contents are heated to 140° C. Oil in an amount of 287 parts is added and the contents are stirred for one additional hour. The contents are filtered using a filter aid to give 590 parts of clear oil. Analyses: 1.46% $Na_2SO_4$ ash; 13.6 total base number.

EXAMPLE 2
(A1)+(B1)

Added to a 2 liter 4-neck flask are 438 parts (0.025 equivalents of a maleinated ethylene propylene copolymer of the product of Example (A1)-7, 337 parts diluent oil and 44 parts (0.025 equivalents) of sodium overbased amine of the product of Example (B1)-4. The contents are heated to 160° C. and held for 3 hours. The IR showed no anhydride peak at 1798 $cm^{-1}$. The contents are filtered using a filter aid to give 745 parts of clear oil. Analyses: 2.8% $Na_2SO_4$ ash; 25.9 total base number.

EXAMPLE 3

(A1)+(B2)

Added to a 2 liter 4-neck flask are 350 parts (0.02 equivalents) of a maleinated ethylene propylene copolymer of the product of Example (A1)-7. At 100° C. is added 24 parts (0.02 equivalents) of a calcium overbased carboxylic acid of the product of Example (B2)-1 over five minutes. The temperature is increased to 150–160° C. and held for 3 hours. Diluent oil (100 parts) is added and the contents are stirred at 150° C. for an additional hour. Due to the high viscosity, the contents are not filtered. Due to the high viscosity, the contents are not filtered. Analyses: 1.9% $CaSO_4$ ash; 15.7 total base number.

EXAMPLE 4

(A1)+(B3)

Added to a 1 liter 4-neck flask are 525 parts (0.03 equivalents) of a maleinated ethylene propylene copolymer of the product of Example (A1)-7 and 60 parts (0.06 equivalents) of a sodium overbased dispersant of the product of Example (B3)-1. The mixture is stirred at 140° C. for 3 hours in the IR. To the contents is added 100 parts of diluent oil and stirring is continued at 150° C. for 30 minutes. The contents, which is the desired product, are not filtered. Analyses: % $Na_2SO_4$ ash 2.8; total base number 25.6.

EXAMPLE 5

(A2)+(B1)

The total contents of the product of Example (A2)-5 are added to a 1 liter flask and heated to 100° C. Then 51 parts of the product of Example (B1)-5 dissolved in 150 parts diluent oil is added. The addition is exothermic to 150° C. After completing this addition, the contents are held at 150° C. for 0.5 hours and then stripped to remove any volatiles. An additional increment of 150 parts diluent oil is added and the contents are filtered to give a product having % $Na_2SO_4$ ash of 3.05 and total base number of 31.

EXAMPLE 6

(A3)+(B1)

Added to a 1 L flask are 187 pars of the lactone of the product of Example (A3)-1, 170 parts of the composition of Example (B1)-3 and 100 parts toluene. The contents are stirred and the temperature is increased to reflux and held at reflux for 4 hours. The contents are then vacuum stripped at 150° C. and 25 millimeters of mercury. Analyses: % calcium sulfate ash is 11.9 and total base number to bromophenol blue is 123.

EXAMPLE 7

(A3)+(B2)

Added to a 1 L flask are 206 parts of the lactone of the product of Example (A3)-1, 121 parts of the calcium overbased carboxylic acid of the product of Example (B2)-1 and 100 parts of toluene. The contents are stirred and heated to reflux and held for 3 hours. An IR showed an anhydride peak at 1800 $cm^{-1}$. Added is an additional 12 parts of the product of Example (B2)-1 and the contents are held at reflux and additional 4 hours. The IR showed a weak anhydride peak at 1815 $cm^{-1}$ and an ester band at 1734 $cm^{-1}$. An additional 12 parts of the product of Example (B2)-1 is added followed by refluxing for 4 hours. There is no further change in the IR. The contents are vacuum stripped at 150° C. and 25 millimeters of mercury. Analyses: % calcium sulfate ash is 18.6 and total base number to bromophenol blue is 128.

To establish the efficacy of this invention, the inventive composition of the metal-containing polymer prepared by the reaction of (A) and (B) along with other components are blended together to give an inventive test formulation. This inventive test formulation is measured against a baseline formulation. The baseline formulation contains all the components of the test formulation but for the reaction product of (A) and (B). Both the inventive test formulation and the baseline formulations are considered to be fully formulated crankcase oils.

Formulations containing the inventive compositions are evaluated in the cold cranking simulation (CCS). This is a procedure developed by the American Society for Testing and Materials (ASTM) which has been assigned the designation of ASTM D5293. This procedure is directed to a moderately high shear rate viscometer which correlates with engine cranking speed at low temperatures, and the cranking viscosity limits are determined by the CCS, as defined in the SAE J300 Standard. The formulation is a 15W40 grade and the value reported for the CCS is the viscosity determined at −15° C. and reported in centipoise (cPs). Results are tabulated in Table I. An improvement is evident when the invention formulation viscosity is lower than the formulation that does not contain the inventive composition.

Formulations containing the inventive compositions are also evaluated in the Thermo-Oxidation Engine Oil Simulation Test (TEOST). TEOST is a registered trademark of Tannas Co. The TEOST was originally developed to evaluate the deposit formation tendencies of API SF quality engine oils brought in contact with very hot turbocharger components. Deposits are measured on the rod and the filter, as well as a total deposit of both the rod and filter. These results are also tabulated in Table I. An improvement in this test occurs when the inventive formulation deposits are less than the deposits from a formulation that does not contain the inventive composition.

TABLE I

|  | Formulation Containing | | |
| --- | --- | --- | --- |
|  | Baseline | Example 1 | Example 2 |
| Cold Cracking Simulator (cPs) | 3010 | 2850 | 2290 |
| TEOST |  |  |  |
| Rod Deposits, mg | 17.9 | 8.6 | 11.8 |
| Filter Deposits, mg | 1.9 | 1.6 | 2.0 |
| Total Deposits, mg | 19.8 | 10.2 | 13.8 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A metal containing polymer composition comprising;
    a metal overbased imide or ester functionalized polymer prepared by reacting
    (A) a polymer comprising
        (A1) an acidic functionalized polymer or ester functionalized polymer comprising a polyolefin having attached or grafted acidic functionality or ester functionality, said polyolefin having a number average molecular weight of at least 500;

(A2) an acidic mixed ester-acid of a carboxy containing interpolymer, said interpolymer having a reduced specific viscosity of from about 0.05 to about 2 and being derived from at least two monomers, one of said monomers being a low molecular aliphatic olefin, styrene or substituted styrene wherein the substituent is a hydrocarbyl group containing from 1 up to 18 carbon atoms, and the other of said monomers being an alpha, beta-unsaturated aliphatic acid, anhydride or ester thereof, said ester being characterized by the presence within its polymeric structure of a pendant polar group which is derived from the carboxy groups of said ester:

(a) a relatively high molecular weight carboxylic ester group, said carboxylic ester group having at least 8 aliphatic carbon atoms in the ester radical and (b) a relatively low molecular weight carboxylic ester group, said carboxylic ester group having no more than 7 aliphatic carbon atoms in the ester radical; wherein the molar ratio of (a):(b) is (1–20): 1; or (A3) an ester functionalized polymer comprising a lactone comprising the reaction product of one or more hydroxyaromatic compounds, most of the units of which are hydrocarbyl-substituted; provided that if the hydroxyaromatic compound comprises bridged ring units, then substantially all such units are hydroxyl- and hydrocarbyl-substituted; a carboxy-substituted carbonyl compound or a source thereof; and a carbonyl compound other than a carboxy-substituted carbonyl compound, or a source thereof; and (B) a metal overbased composition that contains reactive basic functionality comprising (B1) a metal overbased amine wherein the reactive basic functionality is a primary or secondary amino group, (B2) a metal overbased hydroxy substituted carboxylic acid wherein the reactive basic functionality is a hydroxy group, or (B3) a metal overbased dispersant wherein the reactive basic functionality is a primary or secondary amino group.

2. The composition of claim 1 wherein within (A1) the acid functionality is a carboxylic acid functionality.

3. The composition of claim 1 wherein within (A1) the polyolefin contains from 0.001 to about 5 weight percent carboxylic acid functionality.

4. The composition of claim 1 wherein the polyolefin of (A1) is present in the metal containing polymer composition at from 0.1 to about 10 weight percent.

5. The composition of claim 1 wherein the polyolefin of (A1) is present in the metal containing polymer composition at from 0.1 to about 5 weight percent.

6. The composition of claim 1 wherein the number average molecular weight (Mn) of the polyolefin is from 20,000 to 500,000.

7. The composition of claim 1 wherein within (A1) the polyolefin is an elastomeric polyolefin wherein the olefin is a mono-olefin and contains up to 4 carbon atoms.

8. The composition of claim 6 wherein the elastomeric polyolefin comprises polyethylene elastomer, polypropylene elastomer or ethylene/propylene elastomer.

9. The composition of claim 6 wherein the elastomeric polyolefin is ethylene/propylene elastomer.

10. The composition of claim 1 wherein within (A1) the polyolefin is an α-olefin copolymer wherein the a-olefin contains from 6 to 24 carbon atoms.

11. The composition of claim 1 wherein the polyolefin is a random block copolymer comprising a mono-vinyl aromatic/diene copolymer or a hydrogenated mono-vinyl aromatic/diene copolymer.

12. The composition of claim 11 where the random block copolymer is a hydrogenated mono-vinyl aromatic/diene copolymer.

13. The composition of claim 12 where the number average molecular weight of the random block copolymer is not more than 1,000,000.

14. The composition of claim 12 where the random block copolymer has 30 to 80 percent by weight dienes and 20 to 70 percent by weight mono-vinyl aromatics.

15. The composition of claim 14 wherein said diene is isoprene or butadiene, wherein said mono-vinyl substituted aromatic is styrene or an alkyl substituted styrene where the alkyl group contains from 1 up to 4 carbon atoms and wherein hydrogenation of the random block copolymer removes at least 94 percent of the original olefinic unsaturation.

16. The composition of claim 1 wherein within the acidic functionalized polymer (A1), the attached or grafted acid functionality is derived from maleic anhydride or maleic acid.

17. The composition of claim 1 wherein the attached or grafted ester functionalized polymer (A1), is prepared by reacting a polyolefin with an ester of the formula

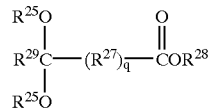

wherein each of $R^{29}$ and $R^{28}$ and each $R^{25}$ is independently hydrogen or an aliphatic group containing from 1 to 7 carbon atoms, $R^{27}$ is an alkylene group containing from 1 to 4 carbon atoms and q is 0 or 1.

18. The composition of claim 17 wherein $R^{29}$ is hydrogen, one $R^{25}$ is methyl and the other $R^{25}$ is hydrogen, $R^{28}$ is methyl and q is zero.

19. The composition of claim 1 wherein the molar ration of (a):(b) is (1–10)-1.

20. The composition of claim 1 wherein within (A2), the interpolymer is a styrene-maleic anhydride interpolymer having a reduced specific viscosity of from about 0.1 to about 1.

21. The composition of claim 1 wherein within (A2), the relatively high molecular weight carboxylic ester group of (a) has from 8 to 24 aliphatic carbon atoms and the relatively low molecular weight carboxylic ester group of (b) has from 3 to 5 carbon atoms.

22. The composition of claim 1 wherein within (A2), the carboxy-containing interpolymer is a terpolymer of one molar proportion of styrene, one molar proportion of maleic anhydride and less than 0.3 molar proportion of a vinyl monomer.

23. The composition of claim 1 wherein within (A2), the low molecular weight aliphatic olefin is selected from the group consisting of ethylene, propylene or isobutylene.

24. The composition of claim 1 wherein the lactone (A3) comprises nolecules containing the structure

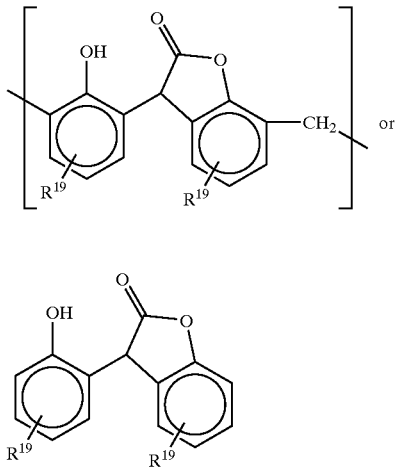

wherein each $R^{19}$ is independently a hydrocarbyl group that contains from 8 to 400 carbon atoms and f is 0 or 1.

25. The composition of claim 1 wherein within (B1), the metal overbased amine is represented by the structure $R^1R^2(B^1)(MA)_x$ wherein $R^1$ and $R^2$ are each independently hydrogen or a hydrocarbyl group, amino-substituted hydrocarbyl group, hydroxy-substituted hydrocarbyl group, alkoxy-substituted hydrocarbyl group, or amino groups, wherein the hydrocarbyl group contains from 4 to 50 carbon atoms, provided that $R^1$ and $R^2$ are not both hydrogen, $B^1$ is the reactive basic functionality comprising —NH, M is a metal, A is carbonate, sulfite, sulfate, thiosulfate, phosphite or phosphate and x is an integer of from 1.1 to 40.

26. The composition of claim 1 wherein within (B2), the metal overbased carboxylic acid is represented by the structure $(B^2)R^{17}COOM(MA)_y$, wherein $R^{17}$ is an aliphatic group containing from 10 to 50 carbon atoms, $B^2$ is the reactive basic functionality comprising —OH, M is a metal, A is carbonate, sulfite, sulfate, thiosulfate, phosphite or phosphate and y is an integer of from 1.1 to 10.

27. The composition of claim 1 wherein within (B3), the metal overbased dispersant is represented by the structure $R^{18}(B^3)(MA)_z$ wherein $R^{18}$ is a hydrocarbyl group of the structure

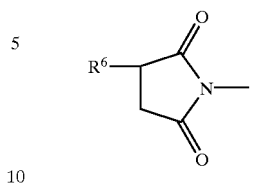

wherein $R^6$ is a hydrocarbyl group that contains from 40 to about 500 carbon atoms, $B^3$ is the reactive basic functionality comprising —$(CH_2CH_2NH)_xH$, wherein x is an integer of from 1 to 8 and $R^{10}$ is hydrogen or an alkyl group containing 1 to 2 carbon atoms, M is a metal, A is carbonate, sulfite, sulfate, thiosulfate, phosphite or phosphate and z is an integer of from 1.1 to 30.

28. The composition of claim 25 wherein $R^2$ is hydrogen or an amino-substituted hydrocarbyl group of the structure $(CH_2)_3NH_2$, $R^1$ is an aliphatic group containing from 10 to about 50 carbon atoms an amino-substituted hydrocarbyl group of the structure $R^4NH(CH_2)_3$ wherein $R^4$ is an aliphatic group containing from 10 to about 50 carbon atoms, with the proviso that when $R^1$ is $R^4NH(CH_2)_3$ that $R^2$ is not $(CH_2)_3NH_2$.

29. The composition of claim 28 wherein $R^1$ contains from 12 to 26 carbon atoms.

30. The composition of claim 28 wherein $R^4$ contains from 12 to 26 carbon atoms.

31. The composition of claim 26 wherein $R^{17}$ is an aliphatic group that contains up to 23 carbon atoms.

32. The composition of claim 26 wherein $R^{17}$ is an aliphatic group that contains from 11 to 17 carbon atoms.

33. The composition of claim 27 wherein the hydrocarbyl group $R^6$ is a substituent group derived from a polyalkene, said polyalkene being characterized by a Mn value of 500 to about 5000 and a Mw/Mn value of about 1.5 to about 4.

34. The composition of claim 27 where the hydrocarbyl group $R^6$ contains from 50 to 300 carbon atoms.

* * * * *